US012581045B2

(12) United States Patent
Lee

(10) Patent No.: US 12,581,045 B2
(45) Date of Patent: Mar. 17, 2026

(54) ELECTRONIC DEVICE INCLUDING PROJECTOR FOR OUTPUTTING BEAM AND METHOD OF OPERATING SAME

(71) Applicant: Samsung Electronics Co., Ltd., Suwon-si (KR)

(72) Inventor: Sungmin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/944,875

(22) Filed: Nov. 12, 2024

(65) Prior Publication Data

US 2025/0159119 A1     May 15, 2025

Related U.S. Application Data

(63) Continuation of application No. PCT/KR2024/017859, filed on Nov. 12, 2024.

(30) Foreign Application Priority Data

Nov. 13, 2023     (KR) ........................ 10-2023-0156495

(51) Int. Cl.
*H04N 9/31* (2006.01)

(52) U.S. Cl.
CPC ......... *H04N 9/3179* (2013.01); *H04N 9/3152* (2013.01); *H04N 9/3191* (2013.01)

(58) Field of Classification Search
CPC ...... H04N 9/31; H04N 9/3179; H04N 9/3152; H04N 9/3191; G03B 21/14; G03B 17/54
(Continued)

(56) References Cited

U.S. PATENT DOCUMENTS 7,390,092 B2 * 6/2008 Belliveau ............... H05B 47/18
                                                                       348/744
8,104,899 B2 1/2012 Ha et al.
(Continued)

FOREIGN PATENT DOCUMENTS

CN          114245091 A       3/2022
JP    2005/313291 A2    11/2005
(Continued)

OTHER PUBLICATIONS

International Search Report and written opinion dated Feb. 21, 2025, issued in International Application No. PCT/KR2024/017859

*Primary Examiner* — Sherrie Hsia
(74) *Attorney, Agent, or Firm* — Jefferson IP Law, LLP

(57)     ABSTRACT
An electronic device according to an embodiment may include a camera, memory, a driving device configured to move a location of the electronic device, a projector configured to output a beam, an adjustment device configured to adjust at least one of an angle or a height of the beam output from the projector, and a processor. The processor according to an embodiment may be configured to identify, when the electronic device is located in a predetermined space, first values for locations at which a beam corresponding to a content is to be output through the projector in the predetermined space. The processor according to an embodiment may be configured to determine a first location at which a beam corresponding to a content is to be output through the projector, based on the first values, and control the driving device so that the electronic device is moved to the first location. The processor according to an embodiment may be configured to output, when the electronic device is moved to the first location, a first beam for testing through the projector on a first surface corresponding to the first location. The processor according to an embodiment may be configured to identify whether the first image satisfies a designated
(Continued)

image condition by inputting, to a first artificial intelligence (AI) model stored in the memory, a first image which is captured through the camera, corresponding to the first beam which is displayed on the first surface. The processor according to an embodiment may be configured to control, based on identifying that the first image does not satisfy the designated image condition, at least one of the adjustment device or the driving device so that the first image satisfies the designated image condition. The processor according to an embodiment may be configured to, based on identifying that the first image satisfies the designated image condition, output the first beam corresponding to the content through the projector on the first surface while controlling, at least one of the adjustment device or the driving device to a state corresponding to the designated image condition.

20 Claims, 17 Drawing Sheets

(58) Field of Classification Search
  USPC .................................................. 348/744, 745
  See application file for complete search history.

(56) References Cited

U.S. PATENT DOCUMENTS

| | | |
|---|---|---|
| 10,780,350 B2 | 9/2020 | Taylor et al. |
| 10,893,245 B1 | 1/2021 | Choi et al. |
| 2014/0039674 A1 | 2/2014 | Motoyama et al. |
| 2015/0148960 A1 | 5/2015 | Moore |
| 2017/0323285 A1 | 11/2017 | Xing |
| 2019/0099681 A1 | 4/2019 | Rico et al. |
| 2020/0404232 A1 | 12/2020 | Choi et al. |
| 2023/0040505 A1 | 2/2023 | Chae et al. |
| 2023/0161234 A1* | 5/2023 | Richards ............... G03B 21/28 |
| | | 348/744 |
| 2023/0276032 A1 | 8/2023 | Choi et al. |

FOREIGN PATENT DOCUMENTS

| | | | |
|---|---|---|---|
| JP | 2014-032402 | A | 2/2014 |
| JP | 2015-125188 | A | 7/2015 |
| JP | 2020-136696 | A | 8/2020 |
| KR | 10-1819589 | B1 | 1/2018 |
| KR | 10-2020-0145642 | A | 12/2020 |
| KR | 10-2218805 | B1 | 2/2021 |
| KR | 10-2022-0015000 | A | 2/2022 |
| KR | 10-2023-0105622 | A | 7/2023 |

* cited by examiner

620

1110  1120  1130  1140  1150

ELECTRONIC DEVICE INCLUDING PROJECTOR FOR OUTPUTTING BEAM AND METHOD OF OPERATING SAME

CROSS-REFERENCE TO RELATED APPLICATION(S)

This application is a continuation application, claiming priority under § 365 (c), of an International application No. PCT/KR2024/017859, filed on Nov. 12, 2024, which is based on and claims the benefit of a Korean patent application number 10-2023-0156495, filed on Nov. 13, 2023, in the Korean Intellectual Property Office, the disclosure of which is incorporated by reference herein in its entirety.

TECHNICAL FIELD

The disclosure relates to an electronic device including a projector for outputting a beam and a method of operating same.

BACKGROUND ART

Remarkable development in information communication, semiconductor technologies, and the like has allowed the rapid spread and use of various electronic devices. Recent electronic devices have been developed to perform communication while being carried by a user. The electronic device may refer to a device performing a particular function according to an equipped program thereof, such as a mobile communication terminal, a tablet personal computer (PC), a video/sound device, a desktop PC or laptop computer, a navigation device for automobile, and the like.

The advancement of artificial intelligence technology has led to the widespread adoption of electronic devices that autonomously move and perform specific functions, such as robotic vacuum cleaners. For example, a beam projector capable of autonomous driving may automatically move to a location at which an image is output and project a beam at the corresponding location to output an image.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Solution

Aspects of the disclosure are to address at least the above-mentioned problems and/or disadvantages and to provide at least the advantages described below. Accordingly, an aspect of the disclosure is to provide an electronic including a projector for outputting beam and a method of operating the same.

Additional aspects will be set forth in part in the description which follows and, in part, will be apparent from the description, or may be learned by practice of the presented embodiments.

An electronic device according to an embodiment may include a camera, memory, a driving device configured to move a location of the electronic device, a projector configured to output a beam, an adjustment device configured to adjust at least one of an angle or a height of the beam output from the projector, and a processor. The processor according to an embodiment may be configured to identify, when the electronic device is located in a predetermined space, first values for locations at which a beam corresponding to a content is to be output through the projector in the predetermined space. The processor according to an embodiment may be configured to determine a first location at which a beam corresponding to a content is to be output through the projector, based on the first values, and control the driving device so that the electronic device is moved to the first location. The processor according to an embodiment may be configured to output, when the electronic device is moved to the first location, a first beam for testing through the projector on a first surface corresponding to the first location. The processor according to an embodiment may be configured to identify whether the first image satisfies a designated image condition by inputting, to a first artificial intelligence (AI) model stored in the memory, a first image which is captured through the camera, corresponding to the first beam which is displayed on the first surface. The processor according to an embodiment may be configured to control, based on identifying that the first image does not satisfy the designated image condition, at least one of the adjustment device or the driving device so that the first image satisfies the designated image condition. The processor according to an embodiment may be configured to, based on identifying that the first image satisfies the designated image condition, output the first beam corresponding to the content through the projector on the first surface while controlling, at least one of the adjustment device or the driving device to a state corresponding to the designated image condition.

In a method of operating an electronic device according to an embodiment, the electronic device may include a driving device configured to move a location of the electronic device, a projector configured to output a beam, and an adjustment device configured to adjust at least one of an angle or a height of the beam output from the projector. The method of operating the electronic device according to an embodiment may include an operation of identifying, when the electronic device is located in a predetermined space, first values for locations at which a beam corresponding to a content is to be output through the projector in the predetermined space. The method of operating the electronic device according to an embodiment may include an operation of determining a first location at which a beam corresponding to a content is to be output through the projector, based on the first values, and controlling the driving device so that the electronic device is moved to the first location. The method of operating the electronic device according to an embodiment may include an operation of outputting, when the electronic device is moved to the first location, a first beam for testing through the projector on a first surface corresponding to the first location. The method of operating the electronic device according to an embodiment may include an operation of identifying whether the first image satisfies a designated image condition by inputting, to a first artificial intelligence (AI) model stored in the electronic device, a first image which is captured through a camera included in the electronic device, corresponding to the first beam which is displayed on the first surface. The method of operating the electronic device according to an embodiment may include an operation of controlling, based on identifying that the first image does not satisfy the designated image condition, at least one of the adjustment device or the driving device so that the first image satisfies the designated image condition. The method of operating the electronic device according to an embodiment may include an operation of outputting, based on identifying that the first image satisfies the designated image condition, the first beam corresponding to the content through the projector on the first surface while controlling, at least one of the adjustment device or the driving device to a state corresponding to the designated image condition.

A non-transitory computer-readable recording medium according to an embodiment may store an instruction configured to execute an operation of identifying, when an electronic device is located in a predetermined space, first values for locations at which a beam corresponding to a content is to be output through a projector included in the electronic device in the predetermined space. The non-transitory computer-readable recording medium according to an embodiment may store an instruction configured to execute an operation of determining a first location at which a beam corresponding to a content is to be output through the projector, based on the first values, and controlling a driving device included in the electronic device so that the electronic device is moved to the first location. The non-transitory computer-readable recording medium according to an embodiment may store an instruction configured to execute an operation of outputting, when the electronic device is moved to the first location, a first beam for testing through the projector on a first surface corresponding to the first location. The non-transitory computer-readable recording medium according to an embodiment may store an instruction configured to execute an operation of identifying whether the first image satisfies a designated image condition by inputting, to an artificial intelligence (AI) model stored in the electronic device, a first image which is captured through a camera included in the electronic device, corresponding to the first beam which is displayed on the first surface. The non-transitory computer-readable recording medium according to an embodiment may store an instruction configured to execute an operation of controlling, based on identifying that the first image does not satisfy the designated image condition, at least one of an adjustment device or a driving device included in the electronic device so that the first image satisfies the designated image condition. The non-transitory computer-readable recording medium according to an embodiment may store an instruction configured to execute an operation of outputting, based on identifying that the first image satisfies the designated image condition, the first beam corresponding to the content through the projector on the first surface while controlling, at least one of the adjustment device or the driving device to a state corresponding to the designated image condition.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a micropro-cessor unit (MPU), a system on chip (SoC), an IC, or the like.

Figure 1:
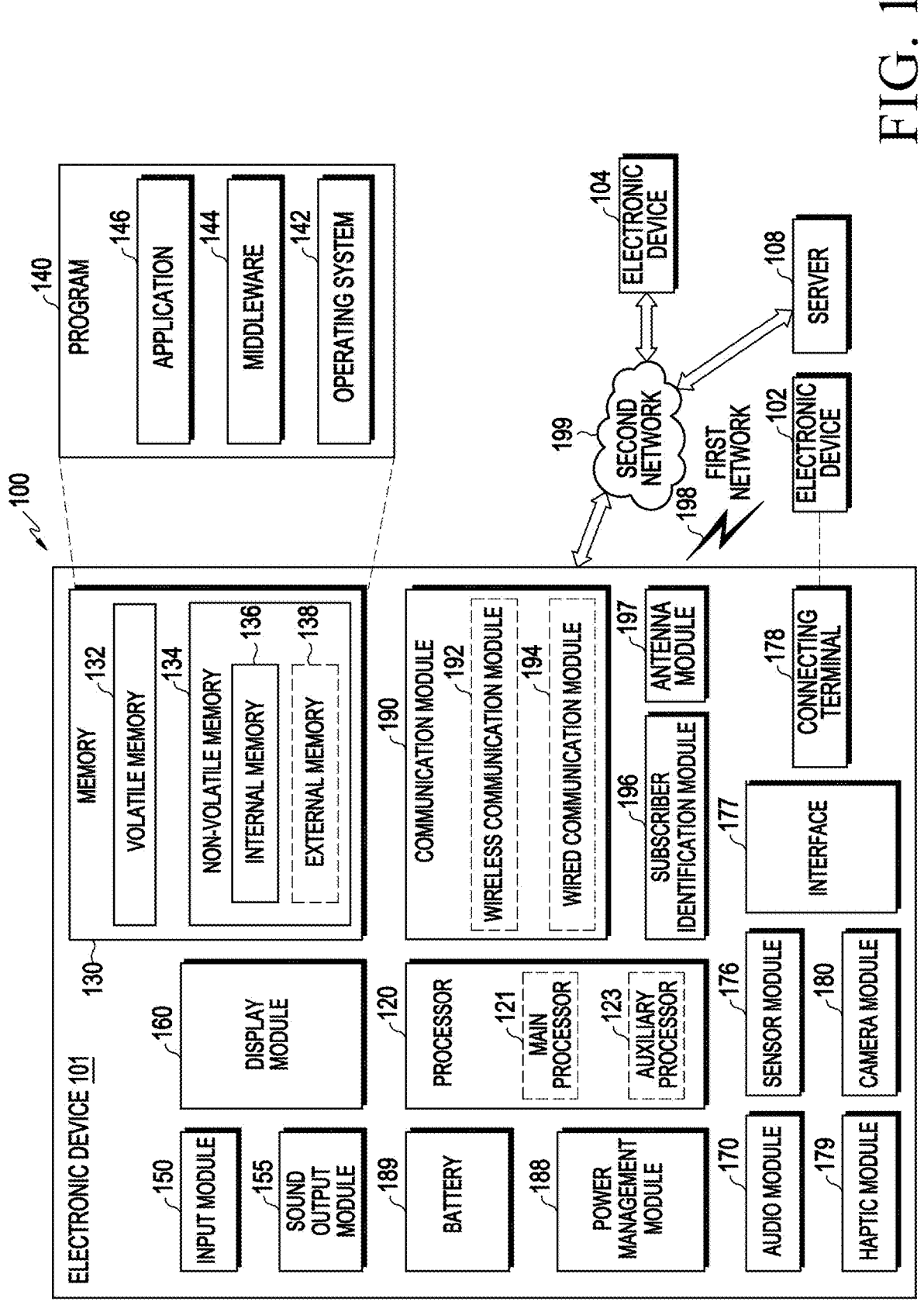
FIG. 1 is a block diagram illustrating an electronic device in a network environment according to an embodiment.

FIG. 1 is a block diagram illustrating an electronic device 101 in a network environment 100 according to an embodi-ment.

Referring to FIG. 1, the electronic device 101 in the network environment 100 may communicate with an elec-tronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identifica-tion module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be imple-mented as a single component (e.g., the display module 160).

The processor 120 may execute, for example, software (e.g., a program 140) to control at least one other component (e.g., a hardware or software component) of the electronic device 101 coupled with the processor 120, and may per-form various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the commu-nication module 190) among the components of the elec-tronic device 101, instead of the main processor 121 while the main processor 121 is in an inactive (e.g., sleep) state, or together with the main processor 121 while the main pro-cessor 121 is in an active state (e.g., executing an applica-tion). According to an embodiment, the auxiliary processor 123 (e.g., an image signal processor or a communication processor) may be implemented as part of another compo-nent (e.g., the camera module 180 or the communication module 190) functionally related to the auxiliary processor 123. According to an embodiment, the auxiliary processor 123 (e.g., the neural processing unit) may include a hard-ware structure specified for artificial intelligence model processing. An artificial intelligence model may be gener-ated by machine learning. Such learning may be performed, e.g., by the electronic device 101 where the artificial intel-ligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

In the following description, configurations that can be understood through the preceding embodiments may be provided with the same reference numerals in the drawings or provided with no reference numerals, and detailed descriptions thereof may also be omitted. The electronic device according to an embodiment set forth herein may be implemented by selectively combining the configurations of different embodiments, and the configuration of an embodiment may be replaced with the configurations of another embodiment. For example, it is noted that the disclosure is not limited to a specific drawing or embodiment.

Figure 2:
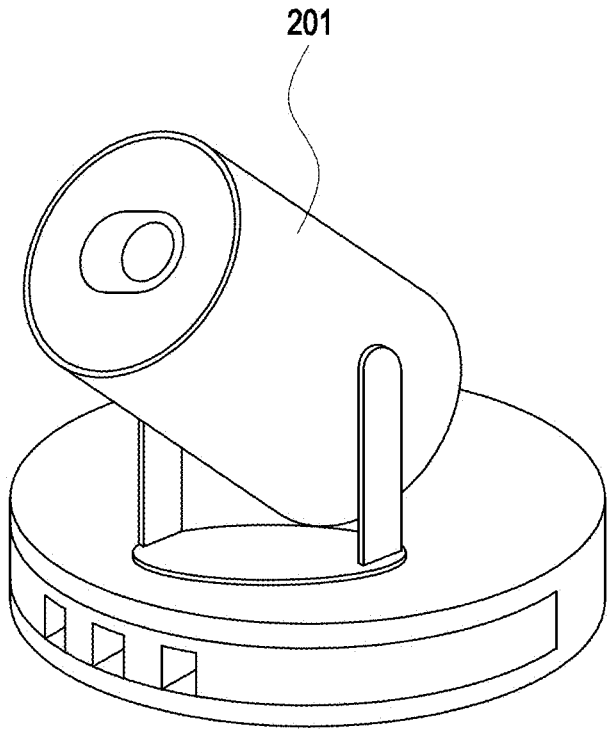
FIG. 2 is a diagram illustrating an electronic device including a projector configured to output a beam according to an embodiment.

FIG. 2 is a diagram illustrating an electronic device including a projector configured to output a beam according to an embodiment.

Referring to FIG. 2, according to an embodiment, the electronic device 201 may be realized in a form of a projector (e.g., a beam projector) capable of moving. The electronic device 201 may automatically move (or autonomously drive) using an artificial intelligence model in a predetermined space.

According to an embodiment, the electronic device 201 may move to an optimal location for outputting a beam by using a projector in a predetermined space. In addition, the electronic device 201 may automatically configure an optimal state (e.g., an angle, brightness, or height) for outputting a beam after moving to the corresponding location.

A conventional electronic device including a projector requires a user to manually determine a location at which a beam is output. Furthermore, after determining a location at which a beam is output, the user needs to manually adjust the angle, brightness, and height of the projector and configure a state for outputting a beam.

Meanwhile, the electronic device 201 according to an embodiment may automatically move to an optimal location for outputting a beam in a predetermined space. In addition, the electronic device 201 may automatically configure an optimal state (e.g., an angle, brightness, or height) for outputting a beam after moving to the corresponding location. As such, the electronic device 201 may provide convenience so that the user may easily and efficiently output a beam to watch a content (e.g., an image and/or a video).

Figure 3:
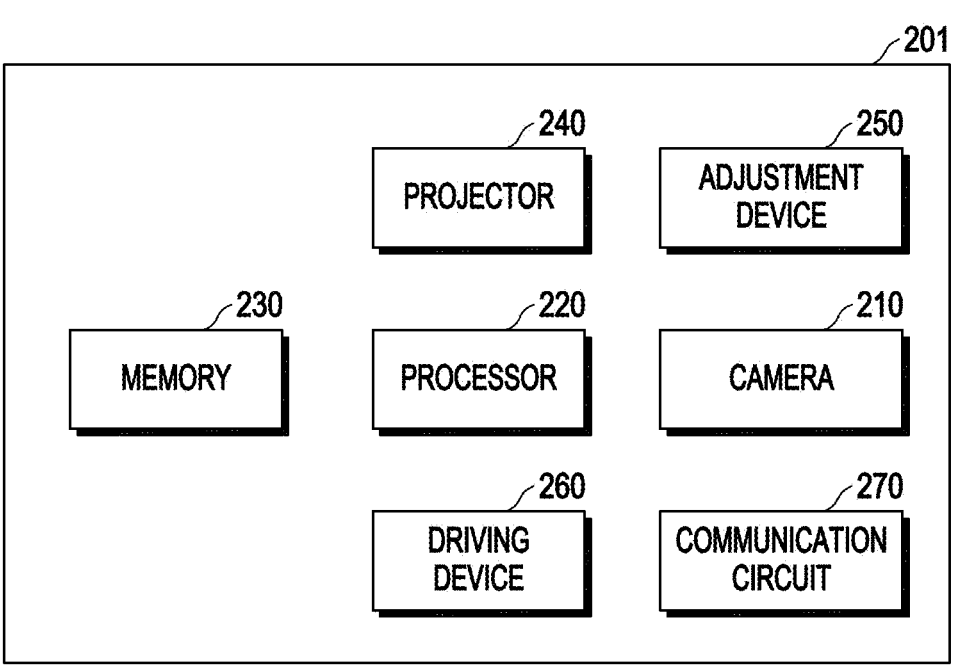
FIG. 3 is a block diagram illustrating configurations of an electronic device according to an embodiment.

FIG. 3 is a block diagram illustrating configurations of an electronic device according to an embodiment.

Referring to FIG. 3, the electronic device 201 may include a camera 210, a processor 220, memory 230, a projector 240, an adjustment device 250, a driving device 260, and a communication circuit 270.

According to an embodiment, the memory 230 may store information (or data) about the electronic device 201. For example, the memory 230 may store information (or data) about various contents (e.g., an image, a video, an audio, and/or an application).

According to an embodiment, the memory 230 may store an artificial intelligence model. For example, the artificial intelligence model may include a pre-trained model. For example, the artificial intelligence model may include an artificial intelligence model capable of image analysis.

According to an embodiment, the processor 220 may control general operations of the electronic device 201. By way of example, the processor 220 may be implemented identical or similar to the processor 120 in FIG. 1.

According to an embodiment, the processor 220 may acquire (e.g., generate, extract, or derive) first values for locations (e.g., a wall surface or a ceiling surface) at which a beam is output through the projector 240 in a predetermined space (e.g., a home, an office, or a residence). The processor 220 may control the driving device 260 to navigate multiple areas (e.g., a room, a living room, a bathroom, a lobby, and/or a reception room) included in the predetermined space. For example, the driving device 260 may include a component (e.g., a wheel) to move the electronic device 201. For example, the processor 220 may control the driving device 260 to move the electronic device 201 in upward, downward, leftward, and rightward directions.

According to an embodiment, the processor 220 may control, by using an AI model related to autonomous driving stored in the memory 230, the driving device 260 to cause the electronic device 201 to automatically move to the multiple areas included in the predetermined space. The processor 220 may acquire images generated by capturing the multiple areas by using the camera 210 while controlling the driving device 260 to move the electronic device 201 to the multiple areas.

According to an embodiment, the processor 220 may analyze the images and acquire first values for locations in the predetermined space. The first values may be acquired by analyzing at least one of the size, color, material, brightness, or presence of an object (e.g., a wall clock, a picture frame, or a light fixture) of the corresponding locations (e.g., a wall surface and/or a ceiling surface). For example, the processor 220 may input the images to a first AI model (e.g., an image analysis model) stored in the memory 230 and acquire the first values for the locations in the predetermined space. For example, the first values may include values (or scores) indicating whether the corresponding locations are suitable for displaying an image corresponding to the beam output through the projector 240. For example, higher values may indicate suitable locations for displaying images corresponding to the beam output through the projector 240.

According to an embodiment, the processor 220 may determine, based on the first values, ranks (e.g., recommendation rank or priorities) of the locations in the predetermined space. For example, the processor 220 may determine a location having a highest of the first values as a location of first rank (e.g., recommendation rank or priority).

According to an embodiment, the processor 220 may store, in the memory 230, information for the ranks and the first values for the locations (e.g., a wall surface or a ceiling surface) at which a beam is output through the projector 240 in a predetermined space (e.g., a home, an office, or a residence). The processor 220 may periodically or aperiodically (e.g., in case of identifying a user's request) update the information for the ranks and the first values stored in the memory 230.

According to an embodiment, the processor 220 may control, in case that a user's request (e.g., a request for starting an operation of the projector 240), the driving device 260 to move to a recommendation location determined based on the ranks and the first values for the locations in the predetermined space stored in the memory 230. In case that the first values for the locations in the predetermined space are not stored in the memory 230, the processor 220 may newly acquire first values for the locations in the predetermined space based on the aforementioned method.

According to an embodiment, the processor 220 may identify, in case that a command displaying a content through the projector 240 in the predetermined space is identified, the first values for locations at which a beam is output.

According to an embodiment, the processor 220 may determine, based on the first values, a first location at which a beam corresponding to a content is to be output through the projector 240. For example, the first locations may be a location corresponding to a highest of the first values. The processor 220 may control the driving device 260 so that the electronic device 201 moves to the first location.

According to an embodiment, the processor 220 may output, in case that the electronic device 201 has moved to the first location, a first beam for testing on a first surface (e.g., a wall surface or a ceiling surface) corresponding to the first location, through the projector 240. For example, the first beam may be for adjusting an output state of the projector 240 so that a first image (e.g., an image displayed on the first surface) corresponding to the beam output from the projector 240 satisfies a designated image condition. For example, as for the processor 220, the output state of the projector 240 may be related to at least one of an angle, a height, a location, or brightness at which the projector 240 outputs a beam.

According to an embodiment, the processor 220 may input, to an artificial intelligence (AI) model stored in the memory, the first image which is captured through the camera 210, corresponds to the first beam, and is displayed on the first surface so as to identify whether the first image satisfies a designated image condition.

According to an embodiment, in case that the processor 220 identifies that the first image does not satisfy the designated image condition, the processor 220 may control at least one of the adjustment device 250 or the driving device 260 so that (or until) the first image corresponding to the first beam satisfies the designated image condition. For example, the adjustment device 250 may include a device configured to adjust the angle and/or the height of the first beam output from the projector 240. For example, the processor 220 may control the adjustment device 250 to adjust at least one of the angle, the height, or the location of the beam output from the projector 240. For example, the processor 220 may control the driving device 260 to adjust at least one of the size or the location of the first image corresponding to the first beam output from the projector 240.

According to an embodiment, in case of identifying that the first image satisfies the designated condition, the processor 220 may output a beam corresponding to a content on the first surface through the projector 240 while controlling at least one of the adjustment device 250 or the driving device 260 to an output state corresponding to the designated image condition.

According to an embodiment, the processor 220 may control at least one external electronic device (e.g., a smart curtain, a screen, a light, and/or a speaker) around the electronic device 201 through the communication circuit 270. For example, the processor 220 may control at least one external electronic device around the electronic device 201 and display an image satisfying the designated image condition on the first surface. For example, the processor 220 may control (e.g., open or close) the curtain around the electronic device 201 or control (e.g., turn on/turn off) the light so as to display an image corresponding to the beam on the first surface.

Based on the method described above, the electronic device 201 may provide an environment in which a user may easily view a content using the projector in an optimal state.

Figure 4:
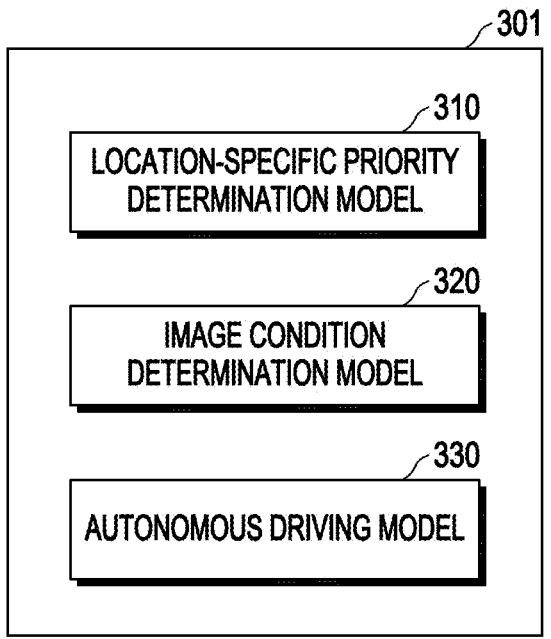
FIG. 4 is a block diagram illustrating an artificial intelligence model stored in an electronic device according to an embodiment.

FIG. 4 is a block diagram illustrating an artificial intelligence model stored in an electronic device according to an embodiment.

Referring to FIG. 4, according to an embodiment, an artificial intelligence model 301 may be stored in memory (e.g., the memory 230 in FIG. 2) of an electronic device (e.g., the electronic device 201 in FIG. 2). For example, the artificial intelligence model 301 may include a pre-trained artificial intelligence model.

According to an embodiment, the artificial intelligence model 301 may include a location-specific priority determination model 310, an image condition determination model 320, and an autonomous driving model 330.

According to an embodiment, the location-specific priority determination model 310 may determine ranks (e.g., recommendation ranks or priorities) of locations (e.g., wall surfaces and/or ceiling surfaces) in a predetermined space. For example, the location-specific priority determination model 310 may acquire, based on images representing multiple areas (e.g., a first room, a second room, and a living room) included in the predetermined space (e.g., a home), first values for locations (e.g., wall surfaces and/or ceilings) included in the multiple areas. For example, the first values may be determined based on at least one of a color, a pattern, a material, a size, a curvature, and presence of an object on the wall surfaces and/or ceilings. For example, the greater a size of a wall surface (or ceiling surface), the greater a first value of the corresponding to the wall surface. For example, the first value of the wall surface (or the ceiling surface) may be higher if the wall surface has no pattern (or design) or is closer to white. For example, the first value of the wall surface (or the ceiling surface) may be higher if the wall surface includes a material (e.g., paint finish) smoother or having a smaller curvature. For example, the first value of the wall surface (or the ceiling surface) may be higher if there is no object (e.g., a lighting and/or power button) attached to the wall surface. In addition, in case that there is an object attached to the wall surface (or the ceiling surface), the first value of the wall surface may be higher if the object has a smaller size.

According to an embodiment, the location-specific priority determination model 310 may determines ranks of the locations, based on the first values. In addition, the location-specific priority determination model 310 may determine ranks of the locations included in a predetermined area (e.g., a first room, a second room, or a living room).

According to an embodiment, the location-specific priority determination model 310 may determine ranks (e.g., recommendation ranks or priorities) of the locations included in a predetermined space at least once when the electronic device 201 is used for the first time or is placed in a new location.

According to an embodiment, the image condition determination model 320 may determine whether a first image (e.g., an image displayed on a first surface corresponding to a determined first location) corresponding to a first beam (e.g., a beam for testing) output from a projector (e.g., the projector 240 in FIG. 3) satisfies a designated image condition. For example, the image condition determination model 320 may analyze images generated by capturing the first image displayed on the first surface through a camera (e.g., the camera 210 in FIG. 3) and adjust an output state of the first image. For example, the image condition determination model 320 may control an adjustment device (e.g., the adjustment device 250 in FIG. 3).

According to an embodiment, the autonomous driving model 330 may move the electronic device 201 to a first location recommended by the location-specific priority determination model 310 in a predetermined space. For example, the autonomous driving model 330 may analyze images generated through the camera (e.g., the camera 210 in FIG. 3) and automatically move the electronic device 201 to the first location. For example, the autonomous driving model 330 may control a driving device (e.g., the driving device 260 in FIG. 3).

According to an embodiment, the autonomous driving model 330 may control the driving device 260 so that the electronic device 201 automatically moves to multiple areas included in the predetermined space so as to acquire (or generate) information for ranks and/or the first values of the locations in the predetermined space. Alternatively, the autonomous driving model 330 may control the driving device 260 so that the electronic device 201 automatically moves to multiple areas included in the predetermined space so as to update the information for the ranks and/or the first values of the locations in the predetermined space.

Although FIG. 4 illustrates the artificial intelligence models to include three models 310, 320, and 330, this may be an example. Depending on the implementation, the three models 310, 320, and 330 may be implemented as a single model or multiple models (e.g., three different multiple models).

In a description below, at least a portion of operations of the electronic device 201 may be performed (or controlled) by the processor 220. Depending on the implementation, at least a portion of operations of the electronic device 201 may be performed (or controlled) by the artificial intelligence model 301. However, for convenience of explanation, the subject of the operations will be described as the electronic device 201.

Figure 5:
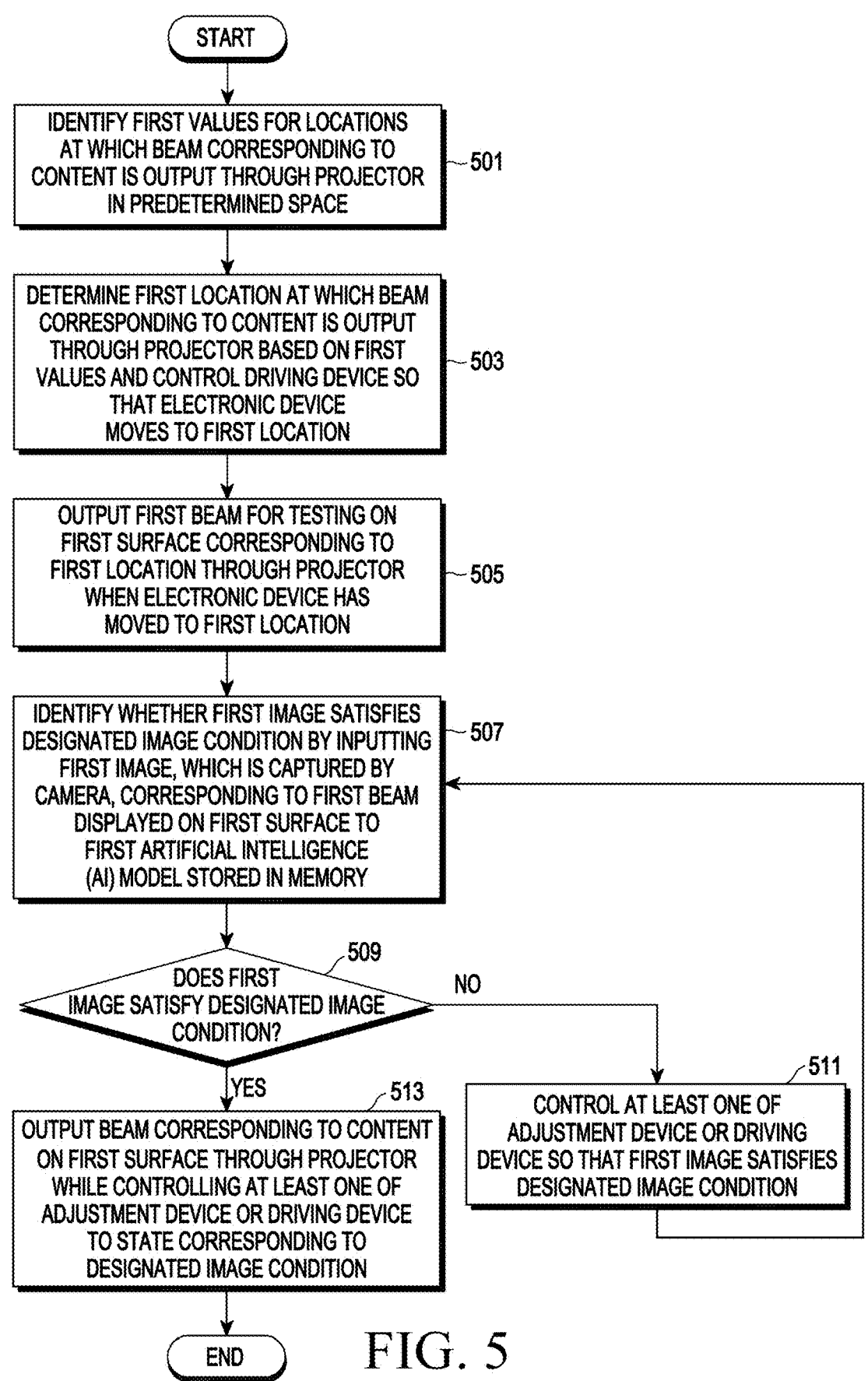
FIG. 5 is a flowchart illustrating a method by which an electronic device automatically moves to a location at which an image is output to output a beam on a corresponding location according to an embodiment.

FIG. 5 is a flowchart illustrating a method by which an electronic device automatically moves to a location at which an image is output to output a beam on a corresponding location according to an embodiment.

Referring to FIG. 5, according to an embodiment, in operation 501, the electronic device (e.g., the electronic device 201 in FIG. 3) may identify first values for locations at which a beam corresponding to a content is to be output through a projector (e.g., the projector 240 in FIG. 3) in a predetermined space (e.g., a home, an office, a school, or a residence). For example, the first values may be pre-stored in memory (e.g., the memory 230 in FIG. 3).

According to an embodiment, in operation 503, the electronic device 201 may determine, based on the first values, a first location at which a beam corresponding to a content is to be output through the projector 240. The electronic device 201 may control a driving device (e.g., the driving device 260 in FIG. 3) so that the electronic device 201 moves to the first location.

According to an embodiment, in operation 505, the electronic device 201 may output, in case that the electronic device 201 has moved to the first location, a first beam for testing on a first surface (e.g., a wall surface or a ceiling surface) corresponding to the first location, through the projector 240.

According to an embodiment, in operation 507, the electronic device 201 may identify whether the first image satisfies a designated image condition by inputting, to a first artificial intelligence (AI) model (e.g., the image condition determination model 320 in FIG. 4) stored in the memory 230, the first image which is captured through a camera (e.g., the camera 210 in FIG. 3), corresponding to the first beam which is displayed on the first surface. For example, the electronic device 201 may identify whether the first image satisfies a designated focus, size, and degree of distortion.

According to an embodiment, in case of identifying that the first image does not satisfy the designated image condition ("NO" in operation 509), in operation 511, the electronic device 201 may control at least one of an adjustment device (e.g., the adjustment device 250 in FIG. 3) or a driving device (e.g., the driving device 260 in FIG. 3) so that the first image satisfies the designated image condition. For example, the electronic device 201 may adjust an angle and/or a height of the projector 240 or adjust a location of the electronic device 201 so that the first image satisfies the designated image condition. The electronic device 201 may control at least one of the adjustment device 250 or the driving device 260 until the first image satisfies the designated image condition.

According to an embodiment, in case of identifying that the first image satisfies the designated condition ("YES" in operation 509), in operation 513, the electronic device 201 may output a beam corresponding to a content on the first surface through the projector 240 while controlling at least one of the adjustment device 250 or the driving device to a state corresponding to the designated image condition.

Figure 6:
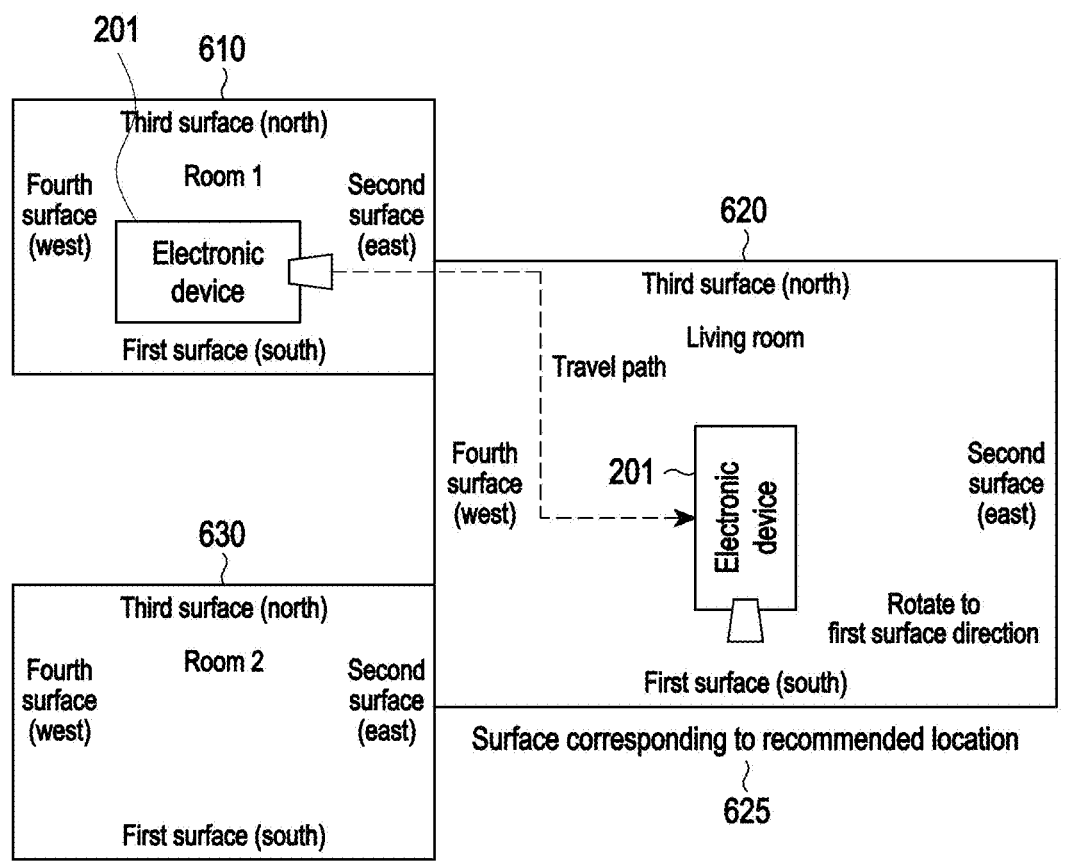
FIG. 6 is a diagram illustrating a method by which an electronic device automatically moves to a location at which an image is output according to an embodiment.

FIG. 6 is a diagram illustrating a method by which an electronic device automatically moves to a location at which an image is output according to an embodiment.

Referring to FIG. 6, according to an embodiment, the electronic device 201 may be located in a predetermined space (e.g., a home) including multiple areas or rooms 610, 620, and 630. In case that a command (e.g., a command generated in response to a user input) configured to execute a projector function is identified, the electronic device 201 may identify first values for locations (e.g., wall surfaces or ceiling surfaces) in the predetermined space stored in the electronic device 201. For example, the first values may include information (e.g., recommendation ranks, scores, areas of the locations, names (e.g., directions) of the locations, and location information (e.g., GPS information) for the locations. For example, the first values may be pre-stored in the electronic device 201 as Table 1 below.

TABLE 1

| Recommendation rank | Score | Area | Location (surface) | Location information (GPS information) |
|---|---|---|---|---|
| 1. | 20 points | Living room | First surface (south surface) | Xyy12334 |
| 2. | 18 points | Room 1 | Second surface (north surface) | YYe34555 |
| 3. | 17 points | Room 2 | Ceiling surface | JHY37872 |
| . . . | . . . | . . . | . . . | . . . |

According to an embodiment, the electronic device 201 may identify a first location 625 (e.g., a first surface (south surface) of a living room 620 in Table 1) having a highest value among the first values. The electronic device 201 may determine (or recommend) the first location 625 as a location at which a beam is output from a projector (e.g., the projector 240 in FIG. 3). The electronic device 201 may automatically move to the first location 625 by controlling the driving device 260.

According to the method described above, in case that a command (e.g., a command generated in response to a user input) configured to execute a projector function is identified, the electronic device 201 may automatically move to a location suitable for a beam to be output from the projector 240. Accordingly, the electronic device 201 may automatically move to a location suitable for a beam to be output without a user input. In addition, the electronic device 201 may minimize time required for identifying a location suitable for a beam to be output.

Figure 7:
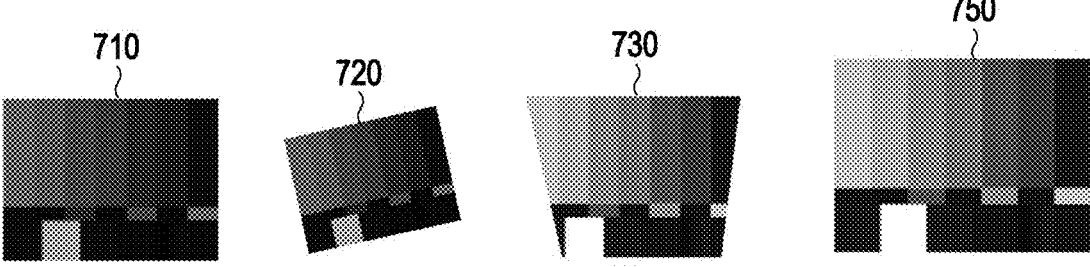
FIG. 7 is a diagram illustrating a method of configuring a state satisfying a designated image condition at a location to which the electronic device moved according to an embodiment.

FIG. 7 is a diagram illustrating a method of configuring a state satisfying a designated image condition at a location to which the electronic device moved according to an embodiment.

Referring to FIG. 7, according to an embodiment, after an electronic device (e.g., the electronic device 201 in FIG. 2) has moved to a first location (e.g., the first location 625 in FIG. 6) (or the front of a first location), the electronic device 201 may output a first beam for testing on a first surface (e.g., first location 625) corresponding to the first location.

The electronic device 201 according to an embodiment may identify whether a first image corresponding to the first beam displayed on the first surface satisfies a designated image condition. For example, a first image 710 out of focus may not satisfy the designated image condition. For example, the first image 720 having a small size and rotated may not satisfy the designated image condition. For example, the first image 730 in distorted form may not satisfy the designated image condition. The electronic device 201 may control at least one of an adjustment device (e.g., the adjustment device 250 in FIG. 3) or a driving device (e.g., the driving device 260 in FIG. 3) and adjust at least one of an angle, a size, a location, brightness, or a height of the first image.

According to an embodiment, the first image 750 may satisfy the designated image condition. The electronic device 201 may stop a test operation in case that the first image 750 displayed on the first surface is identified. Thereafter, the electronic device 201 may output a beam corresponding to a content to the first surface in a corresponding state (or an output state of the projector 240).

According to the method described above, the electronic device 201 may automatically determine or configure the output state of the projector 240. Accordingly, the electronic device 201 may automatically configure a state suitable for a beam to be output without a user input. In addition, the electronic device 201 may minimize a time required for configuring a state suitable for a beam to be output, thus improving user convenience.

Figure 8A:
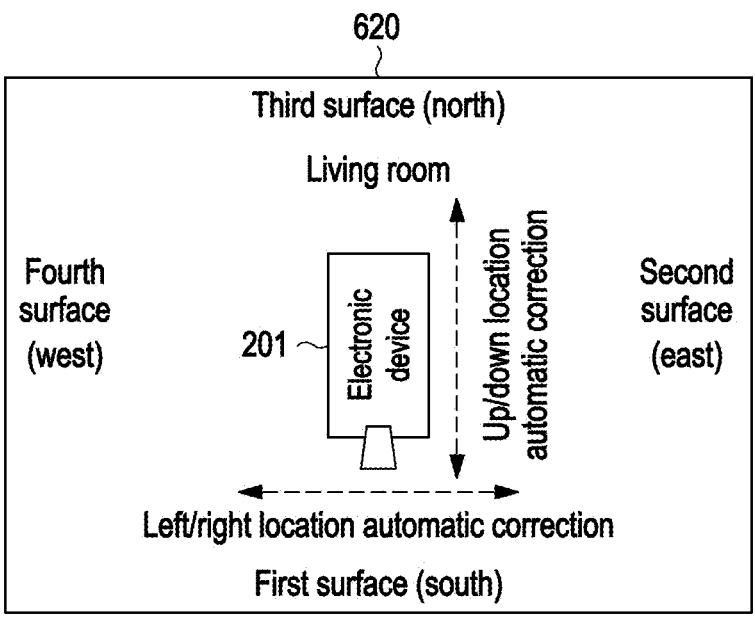
FIGS. 8A and 8B are diagrams illustrating a method of configuring a state satisfying a designated image condition at a location to which the electronic device moved according to an embodiment.
Figure 8B:
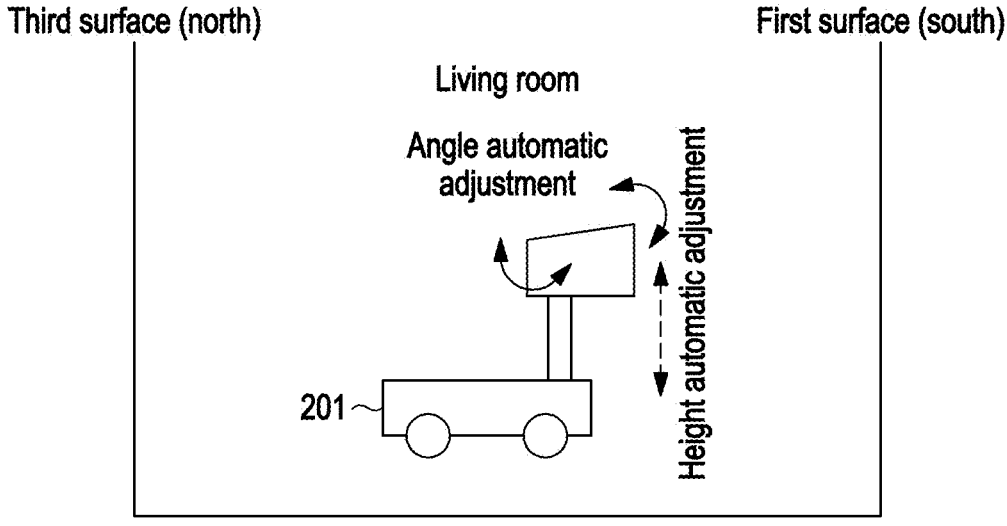

FIGS. 8A and 8B are diagrams illustrating a method of configuring a state satisfying a designated image condition at a location to which the electronic device moved according to an embodiment.

Referring to FIG. 8A, according to an embodiment, the electronic device 201 (e.g., the electronic device 201 in FIG. 3) may control a driving device (e.g., the driving device 260 in FIG. 3) to adjust at least one of a size, a location, or brightness of a first image. For example, the electronic device 201 may control the driving device 260 to correct the location up and down based on a first surface (south surface). In addition, the electronic device 201 may control the driving device 260 to correct the location left and right based on the first surface (south surface). The electronic device 201 may output a first beam to the first surface at the corrected location and identify whether a first image corresponding to the first beam displayed on the first surface satisfies a designated image condition.

Referring to FIG. 8B, according to an embodiment, the electronic device 201 (e.g., the electronic device 201 in FIG. 3) may control an adjustment device (e.g., the adjustment device 250 in FIG. 3) to adjust at least one of an angle, a size, a location, brightness, or a height of a first image. For example, the electronic device 201 may control the adjustment device 250 to correct the height up and down based on the first surface (south surface). In addition, the electronic device 201 may control the adjustment device 250 to correct the angle up and down based on the first surface (south surface). In addition, the electronic device 201 may adjust the angle left and right based on the first surface (south surface). The electronic device 201 may output a first beam to the first surface at the corrected angle and/or height and identify whether a first image corresponding to the first beam displayed on the first surface satisfies a designated image condition.

According to the method described above, the electronic device 201 may automatically determine or configure the output state of the projector 240. Accordingly, the electronic device 201 may automatically configure a state suitable for a beam to be output without a separate user input. In addition, the electronic device 201 may minimize time required for configuring a state suitable for a beam to be output, thus improving user convenience.

Figure 9:
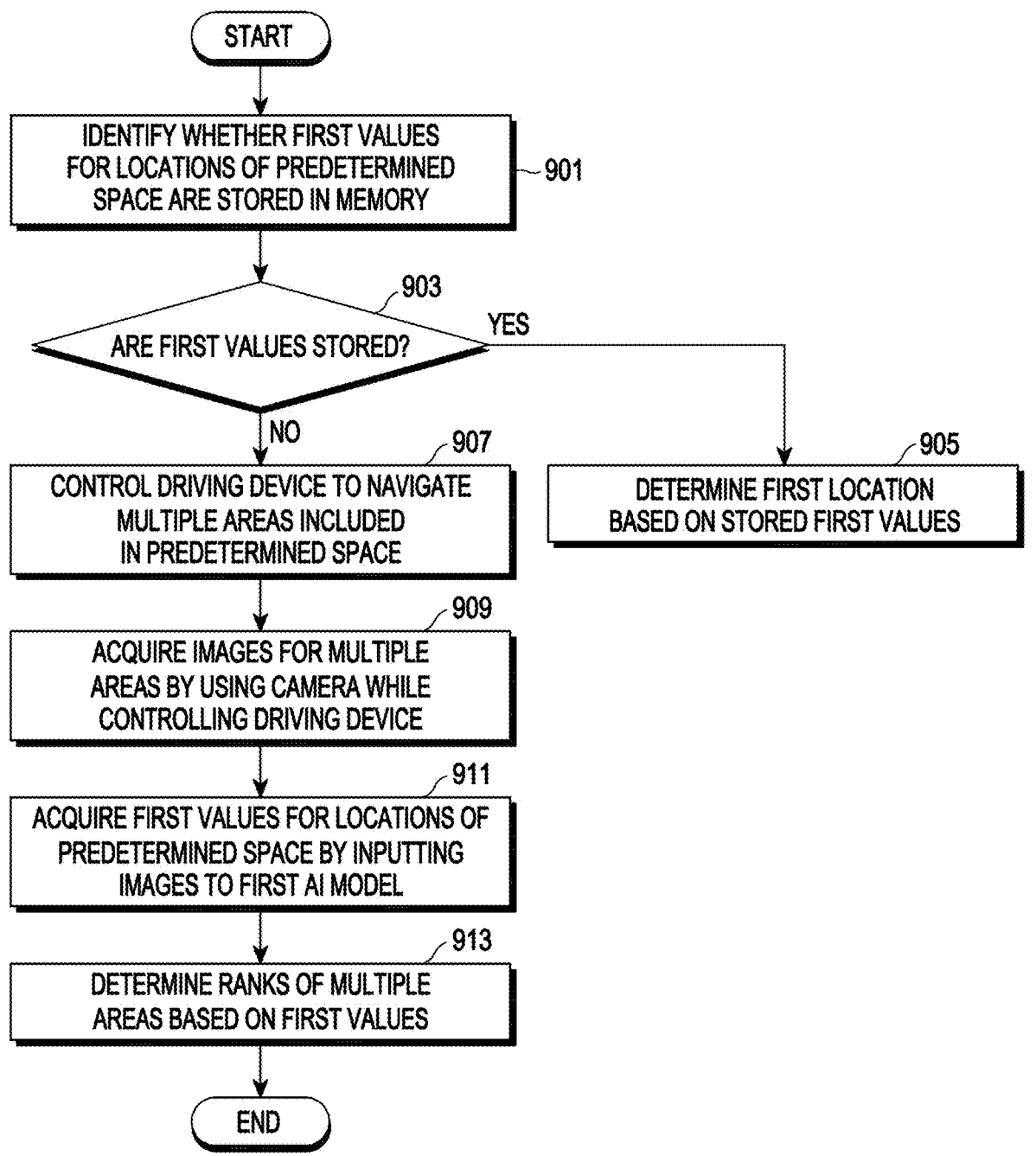
FIG. 9 is a flowchart illustrating a method by which an electronic device determines priorities for predetermined spatial locations according to an embodiment.

FIG. 9 is a flowchart illustrating a method by which an electronic device determines priorities for predetermined spatial locations according to an embodiment.

Referring to FIG. 9, according to an embodiment, in operation 901, the electronic device (e.g., the electronic device 201 in FIG. 3) may identify whether first values for locations in a predetermined space are stored in memory (e.g., the memory 230 in FIG. 3). For example, in case that the electronic device 201 enters a new location or a new space, the electronic device 201 may not store first values for locations suitable for a beam to be output in the location or the space.

According to an embodiment, in case of identifying that the first values for the locations in the predetermined space are stored in the memory 230 ("YES" in operation 903), the electronic device 201 may determine, in operation 905, a first location at which a beam is output, based on the stored first values.

According to an embodiment, in case of identifying that the first values for the locations in the predetermined space are not stored in the memory 230 ("NO" in operation 903), the electronic device 201 may control, in operation 907, a driving device (e.g., the driving device 260 in FIG. 3) to navigate (or scan) multiple areas included in the predetermined space. The electronic device 201 may navigate areas included in the predetermined space to identify locations suitable for a beam to be output in the new location or space. In operation 909, the electronic device 201 may acquire images for the multiple areas included in the predetermined space by using a camera (e.g., the camera 210 in FIG. 3) while controlling the driving device 260 to navigate the predetermined space.

According to an embodiment, in operation 911, the electronic device 201 may acquire the first values for the locations of the predetermined space by inputting the images to a first AI model (e.g., the location-specific priority determination model 310 in FIG. 4).

According to an embodiment, in operation 913, the electronic device 201 may determine, based on the first values, ranks (e.g., recommendation rank or priorities) of the multiple areas. For example, the electronic device 201 may arrange the first values in descending order, and determine a location having a highest value as a location having a highest recommendation rank or priority.

Figure 10:
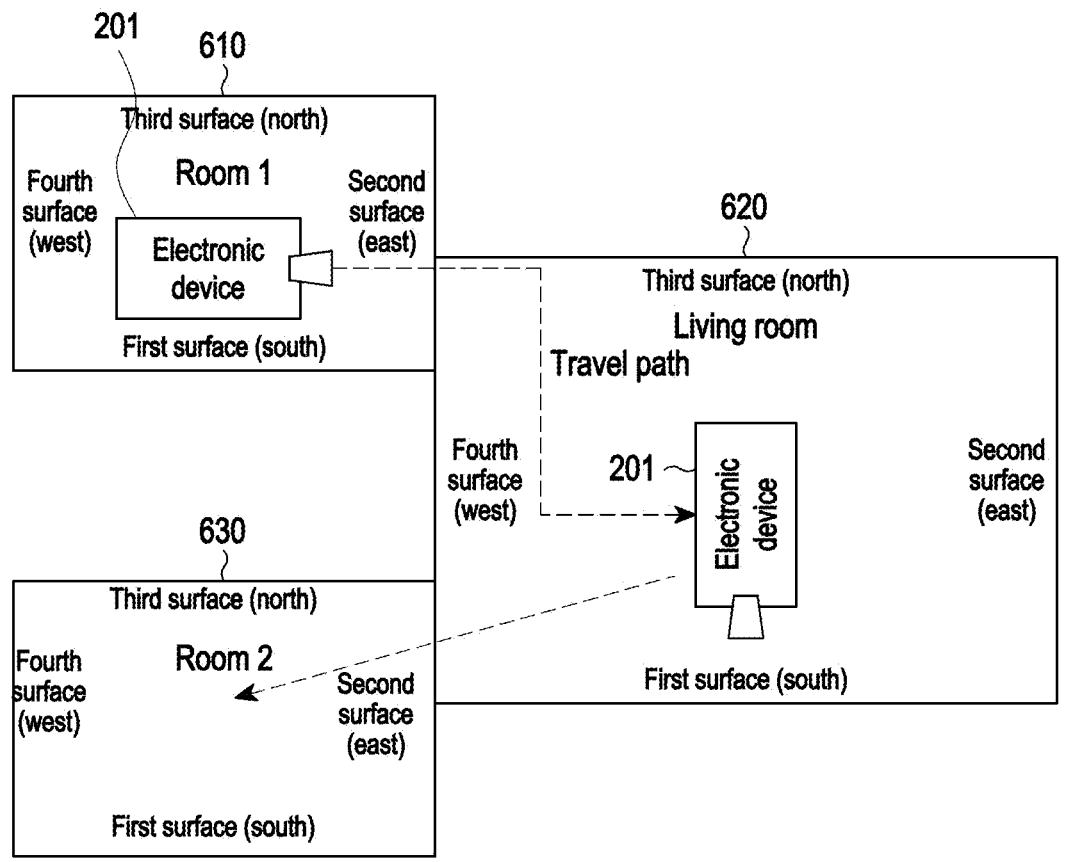
FIG. 10 is a diagram illustrating a method by which an electronic device determines priorities for predetermined spatial locations according to an embodiment.
Figure 11:
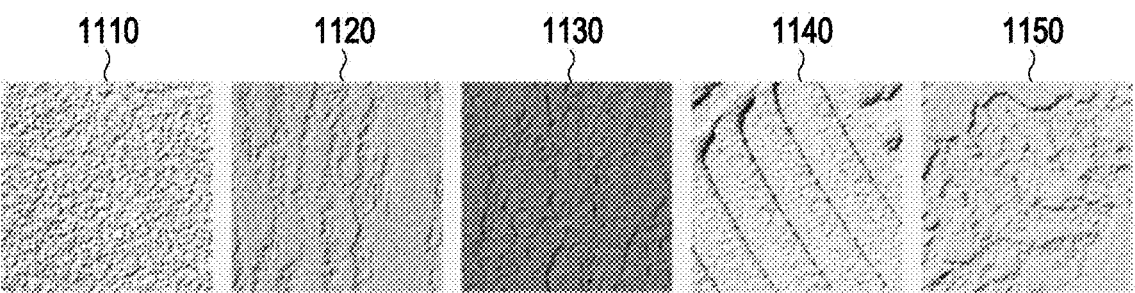
FIG. 11 is a diagram illustrating a method by which an electronic device determines priorities for predetermined spatial locations according to an embodiment.

FIG. 10 is a diagram illustrating a method by which an electronic device determines priorities for predetermined spatial locations according to an embodiment. FIG. 11 is a diagram illustrating a method by which an electronic device determines priorities for predetermined spatial locations according to an embodiment.

Referring to FIG. 10, according to an embodiment, when entering a new predetermined space, the electronic device 201 may newly acquire (or generate) first values for locations at which a beam is output in the predetermined space. To this end, the electronic device 201 may automatically navigate (or scan) multiple areas 610, 620, and 630 included in the predetermined space. For example, the electronic device 201 may sequentially move and navigate a first room 610, a living room 620, and a second room 630. In addition, the electronic device 201 may acquire images generated by capturing the multiple areas 610, 620, and 630 by using a camera (e.g., the camera 210 in FIG. 3) while navigating the multiple areas 610, 620, and 630.

According to an embodiment, the electronic device 201 may analyze the images generated by capturing the multiple areas 610, 620, and 630 by using an AI model (e.g., the location-specific priority determination model 310 in FIG. 4) and acquire first values for locations (e.g., wall surfaces or ceiling surfaces) in the predetermined space depending on an analysis result.

According to an embodiment, the electronic device 201 may determine the first values based on at least one of a color, a pattern, a material, a size, a curvature, and presence of an object of the wall surfaces (or the ceiling surfaces) included in the multiple areas 610, 620, and 630. For example, the greater a size of a wall surface (or ceiling surface), the greater a first value of the corresponding to the wall surface. For example, "the living room 620" among the multiple areas 610, 620, and 630 may include a first surface and a third surface having a size relatively larger than other surfaces. Accordingly, the first surface and the third surface of "the living room 620" may have a high value (or score) related to the size.

Referring to FIG. 11, according to an embodiment, the electronic device 201 may identify a color, a material, or a pattern of wall surfaces (or ceiling surfaces) included in the multiple areas 610, 620, and 630 and determine the first values by considering the identified color, material, and pattern. For example, the first value of the wall surface (or the ceiling surface) may be higher if the wall surface has no pattern (or design) or is closer to white. In addition, the first value of the wall surface (or the ceiling surface) may be higher if the wall surface includes a material (e.g., paint finish) smoother or having a smaller curvature. For example, a surface corresponding to an image 1110 among the multiple images 1110, 1120, 1130, 1140, and 1150 may have a high value related to the color, material, or pattern compared to other surfaces.

According to an embodiment, the electronic device 201 may further determine a curvature and whether an object exists with respect to a predetermined wall surface. The electronic device 201 may determine, based on a corresponding determination result, a value related to the curvature and whether an object exists with respect to the predetermined wall surface.

According to an embodiment, the electronic device 201 may sum values for at least one of the color, the pattern, the material, the size, the curvature, and whether an object exists with respect to the predetermined wall surface to determine a first value for the predetermined wall surface. For example, the first surface of "the living room 620" among the multiple areas 610, 620, and 630 may have a highest first value. In case that a command configured to execute a projector function is identified, the electronic device 201 may determine the first surface of "the living room 620" as a recommendation location. For example, in case that a command configured to execute a projector function is identified, the electronic device 201 may automatically move to a location corresponding to the first surface of "the living room 620" and automatically configure an output state of the projector in the corresponding location.

According to an embodiment, the electronic device 201 may store information (e.g., GPS information) for the corresponding location together with values for the corresponding location. For example, the electronic device 201 may acquire location information of the corresponding location by using a GNSS module (e.g., 192 in FIG. 1) included in the electronic device 201. For example, the electronic device 201 may store location information (e.g., GPS information) of the first surface of "the living room 620" to the first value for the first surface.

According to an embodiment, the first value may be stored in the electronic device 201 (or the memory 230) as Table 1. For example, the first values may include information (e.g., recommendation ranks, scores, areas of the locations, names (e.g., directions) of the locations, and location information (e.g., GPS information) for the locations included in the predetermined space.

According to the method described above, the electronic device 201 may automatically determine or configure the output state of the projector 240. Accordingly, the electronic device 201 may automatically configure a state suitable for a beam to be output without a separate user input. In addition, the electronic device 201 may minimize time required for configuring a state suitable for a beam to be output, thus improving user convenience.

Figure 12:
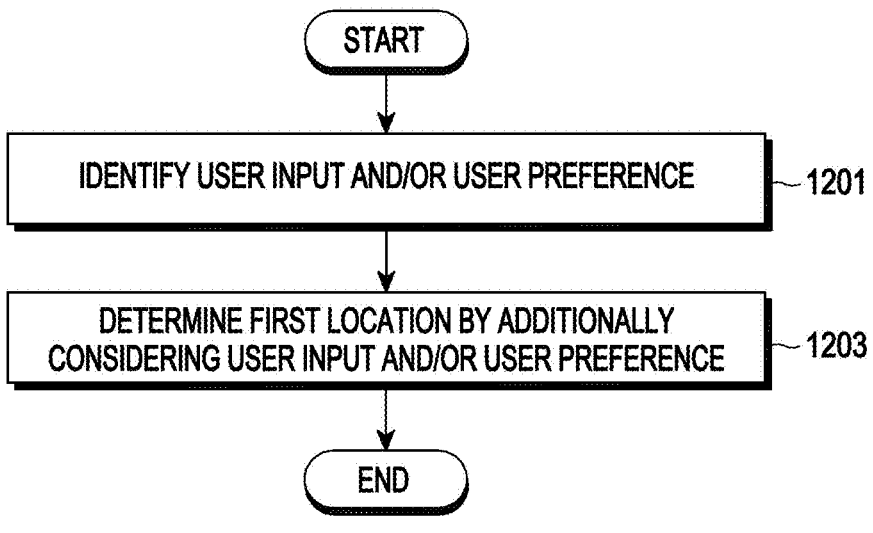
FIG. 12 is a flowchart illustrating a method by which an electronic device determines a first location to which a beam is output by additionally considering user preference or a user input according to an embodiment.

FIG. 12 is a flowchart illustrating a method by which an electronic device determines a first location to which a beam is output by additionally considering user preference or a user input according to an embodiment.

Referring to FIG. 12, according to an embodiment, in operation 1201, the electronic device (e.g., the electronic device 201 in FIG. 3) may identify a user input and/or user preference (or a user configuration value). For example, the user preference (or user configuration value) may be pre-designated by a user.

According to an embodiment, in operation 1203, the electronic device 201 may determine a first location at which a beam is output by additionally considering the user input and/or the user preference (or user configuration value). That is, the electronic device 201 may determine a first location at which a beam is output by additionally considering the user input and/or the user preference (or user configuration value) in addition to the pre-stored first values.

Embodiments related to the aforementioned case will be described in detail in FIGS. 13, 14A, 14B, and 15 below.

Figure 13:
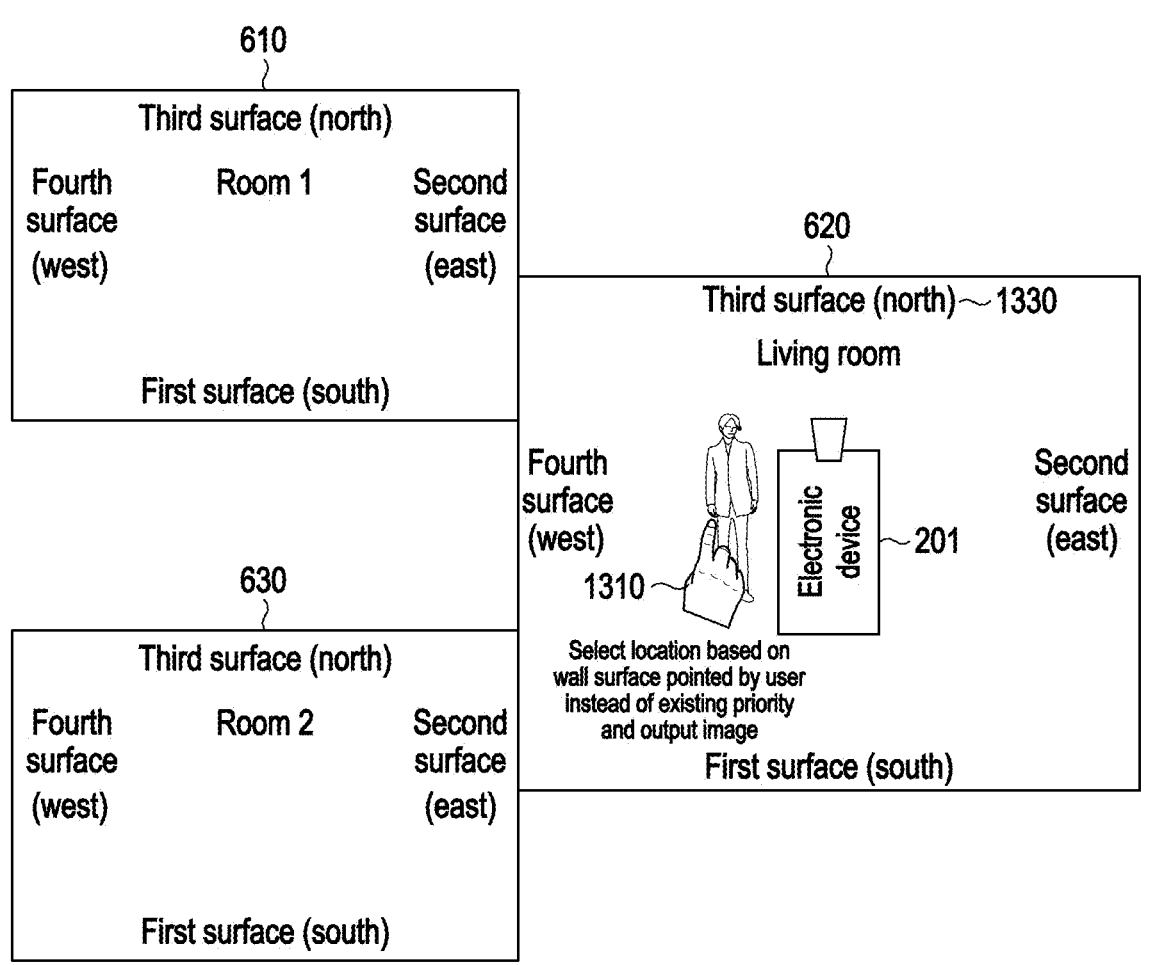
FIG. 13 is a diagram illustrating a method by which an electronic device determines a first location to which a beam is output by additionally considering a user input according to an embodiment.

FIG. 13 is a diagram illustrating a method by which an electronic device determines a first location to which a beam is output by additionally considering a user input according to an embodiment.

Referring to FIG. 13, according to an embodiment, the electronic device 201 may determine a first location at which a beam is output, based on a user input 1310. For example, when the user points to a predetermined wall surface 1330, the electronic device 201 may output a beam on the corresponding predetermined wall surface 1330 (e.g., the third surface of "the living room 620"). For example, the electronic device 201 may identify an input 1310 pointing to the predetermined wall surface 1330 by the user by using a camera (e.g., the camera 210 in FIG. 3). Alternatively, the electronic device 201 may identify an input pointing to the predetermined wall surface 1330 by the user, based on a voice command.

According to an embodiment, in case of determining that the predetermined wall surface 1330 pointed by the user is not suitable for outputting a beam (e.g., in case of determining that a first value of the predetermined wall surface 1330 is lower than a designated value (e.g., 5 out of 20 points), the electronic device 201 may re-identify with the user whether to output a beam on the predetermined wall surface 1330. Alternatively, the electronic device 201 may request the user to re-identify whether a third surface of another area 610 or 630 is pointed.

Figure 14A:
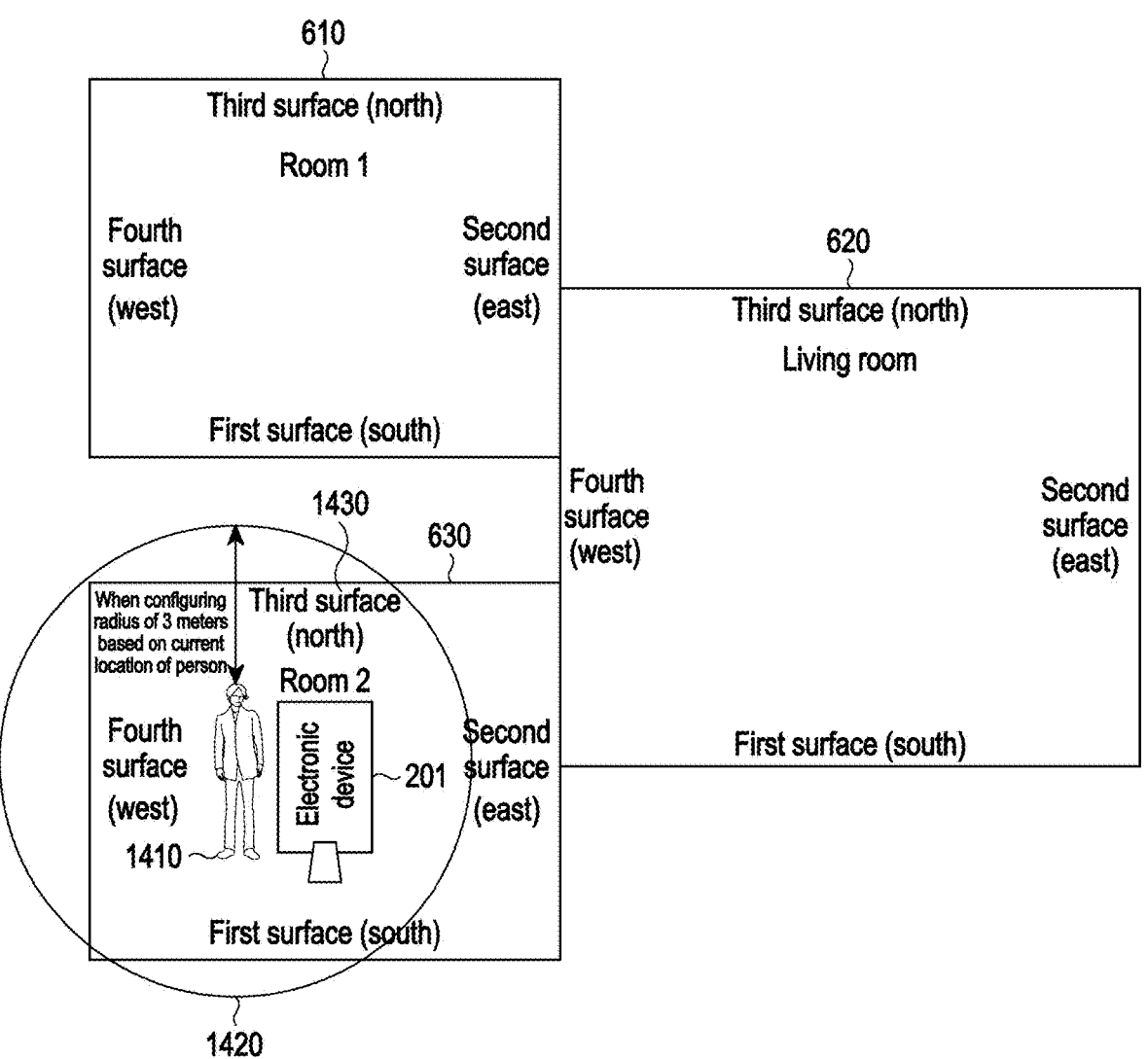
FIGS. 14A and 14B are diagrams illustrating a method by which an electronic device determines a first location to which a beam is output by additionally considering user preference according to an embodiment.
Figure 14B:
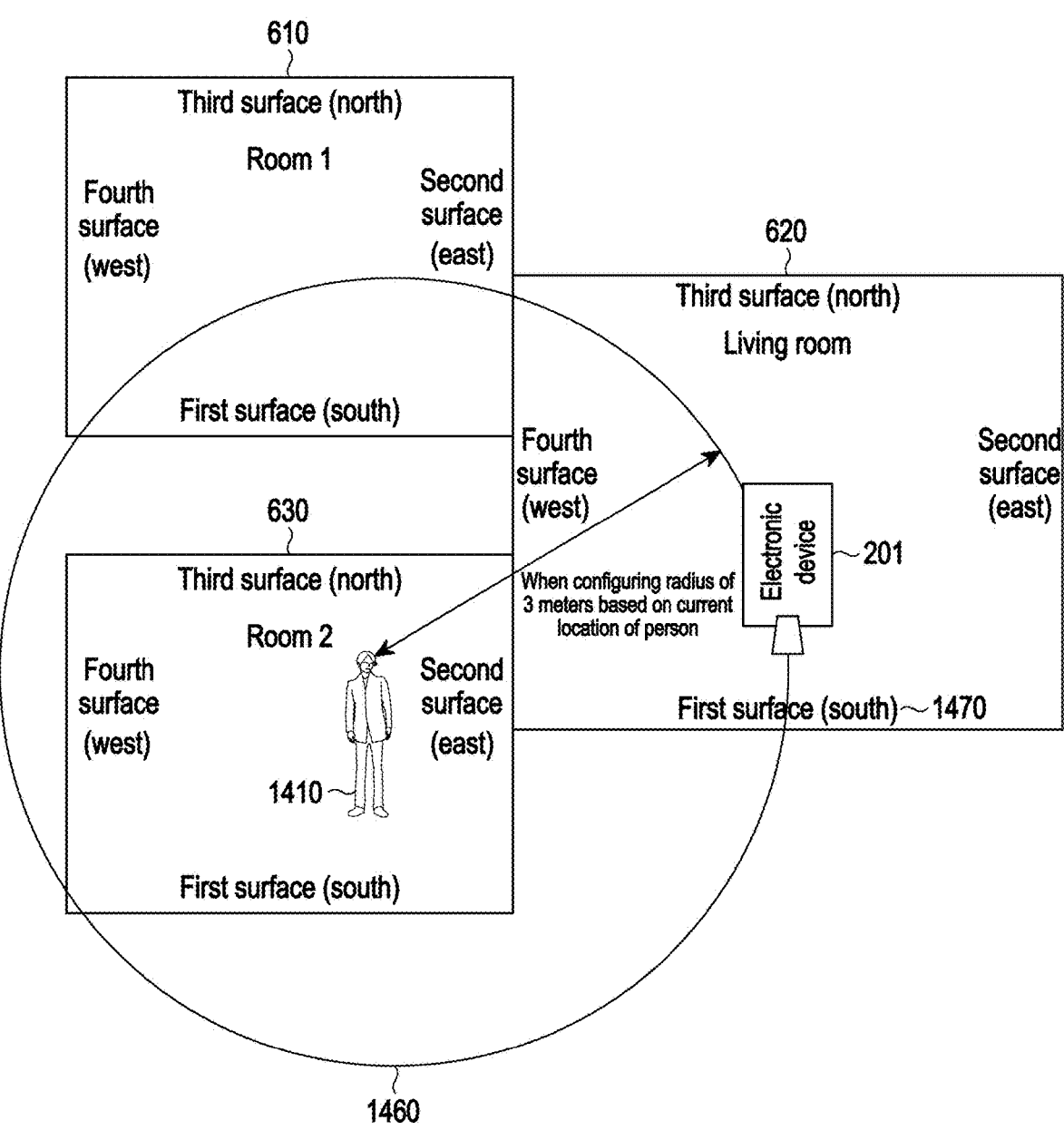

FIGS. 14A and 14B are diagrams illustrating a method by which an electronic device determines a first location to which a beam is output by additionally considering user preference (or a user configuration value) according to an embodiment.

Referring to FIGS. 14A and 14B, according to an embodiment, the electronic device 201 may determine a first location at which a beam is output, based on user preference (or a user configuration value). For example, the electronic device 201 may store information for the user preference (or user configuration value) indicating outputting a beam within a designated distance (e.g., 3 meters or 6 meters) based on a current location of a user 1410. For example, the electronic device 201 may identify the location of the user 1410 by using a camera (e.g., the camera 210 in FIG. 3) or a sensor. Alternatively, the electronic device 201 may identify the location of the user 1410 by analyzing a communication signal received from an electronic device (e.g., a smartphone) carried by the user 1410, by using a communication circuit (e.g., the communication circuit 270 in FIG. 2).

Referring to FIG. 14A, according to an embodiment, the electronic device 201 may determine a first location at which a beam is output in an area 1420 included within a designated distance (e.g., 3 meters) from the current location of the user 1410. For example, the electronic device 201 may determine, as a first location, a third surface 1430 in an area 630 corresponding to "a second room" among the multiple areas 610, 620, and 630.

Referring to FIG. 14B, according to an embodiment, the electronic device 201 may determine a first location at which a beam is output in an area (e.g., third surface 1430) included within a designated distance 1460 (e.g., 6 meters) from the current location of the user 1410. For example, the electronic device 201 may determine, as a first location, a first surface 1470 in an area 620 corresponding to "a living room" among the multiple areas 610, 620, and 630.

Figure 15:
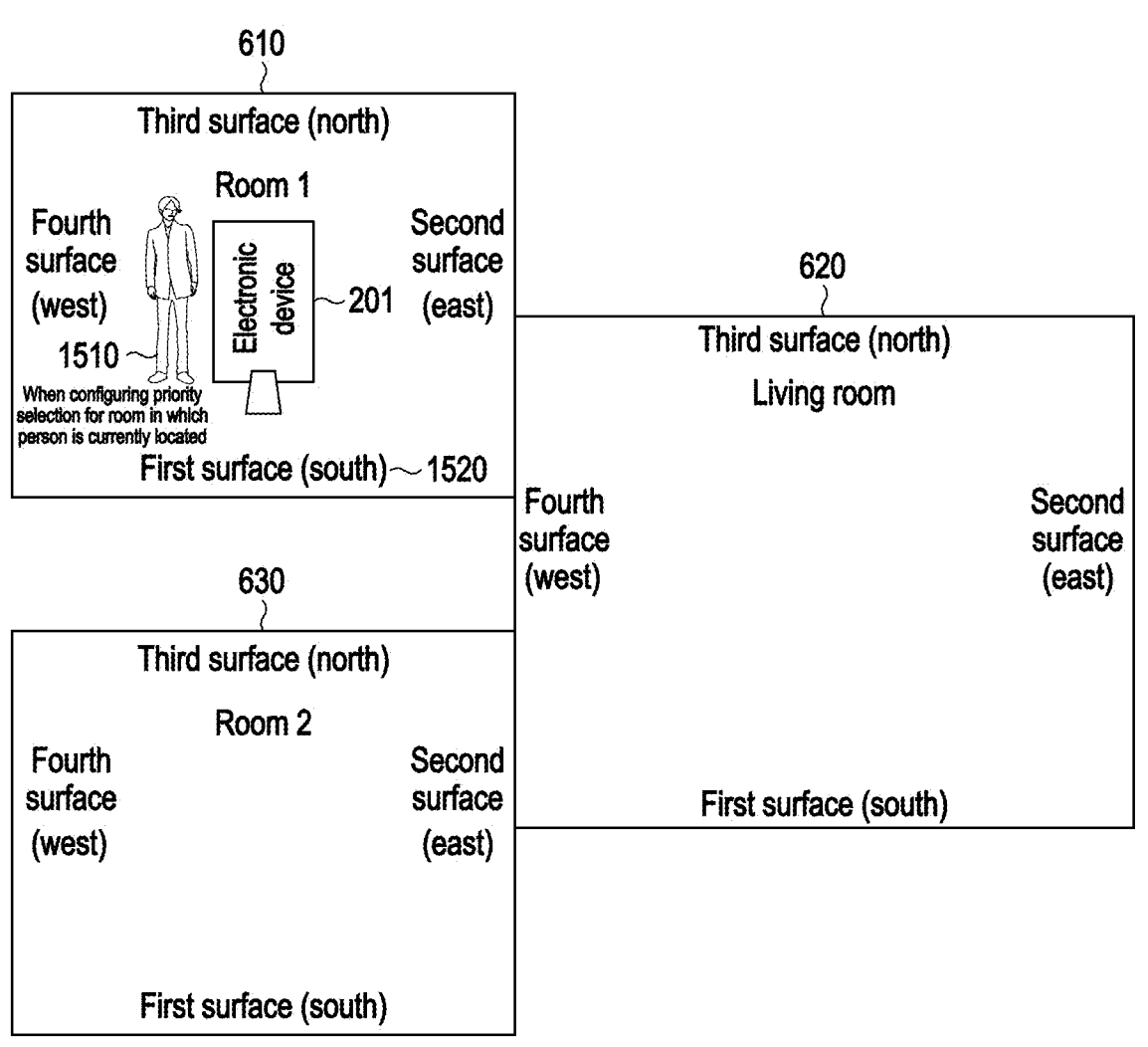
FIG. 15 is a diagram illustrating a method by which an electronic device determines a first location to which a beam is output by additionally considering a user's location according to an embodiment.

FIG. 15 is a diagram illustrating a method by which an electronic device determines a first location to which a beam is output by additionally considering a user's location according to an embodiment.

Referring to FIG. 15, according to an embodiment, the electronic device 201 may determine a first location at which a beam is output, based on user preference (or a user configuration value). For example, the electronic device 201 may store information for the user preference (or user configuration value) indicating outputting a beam in an area (e.g., a room) in which a user 1510 is currently located. For example, the electronic device 201 may identify the location of the user 1510 by using a camera (e.g., the camera 210 in FIG. 3) or a sensor. Alternatively, the electronic device 201 may identify the location of the user 1410 by analyzing a communication signal received from an electronic device (e.g., a smartphone) carried by the user 1510, by using a communication circuit (e.g., the communication circuit 270 in FIG. 2). For example, the electronic device 201 may identify that the user is currently located in a first room 610.

According to an embodiment, the electronic device 201 may determine a first location at which a beam is output in the first room 610 in which a user 1510 is currently located. For example, the electronic device 201 may determine, as the first location, a surface having a highest first value among multiple surfaces (e.g., wall surfaces and/or ceiling surfaces) included in the first area 610. For example, the electronic device 201 may determine a first surface 1520 included in the first room 610 as a first location.

Figure 16:
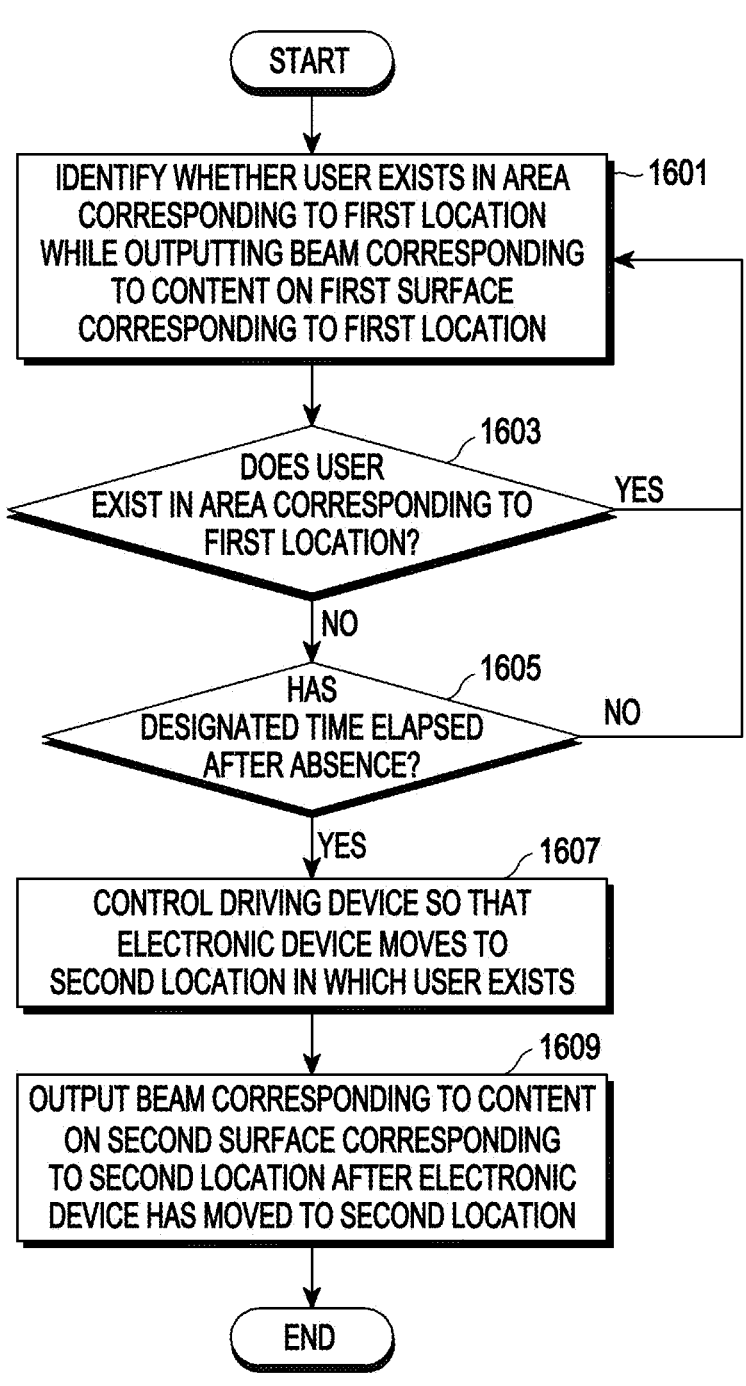
FIG. 16 is a flowchart illustrating a method by which an electronic device tracks a user and outputs a beam from a different location according to an embodiment.

FIG. 16 is a flowchart illustrating a method by which an electronic device tracks a user and outputs a beam from different locations according to an embodiment.

Referring to FIG. 16, according to an embodiment, in operation 1601, the electronic device (e.g., the electronic device 201 in FIG. 3) may identify whether a user exists in an area corresponding to a first location while outputting a beam corresponding to a content on a first surface corresponding to the first location. For example, the electronic device 201 may identify whether the user exists in an area corresponding to the first location by using a camera (e.g., the camera 210 in FIG. 3) or a sensor while outputting a beam corresponding to a content.

According to an embodiment, in case of identifying that the user exists in an area corresponding to the first location ("YES" in operation 1603), the electronic device 201 may continuously identify whether the user exists in an area corresponding to the first location while outputting a beam corresponding to a content on the first surface.

According to an embodiment, in case of identifying that the user does not exist in an area corresponding to the first location ("NO" in operation 1603), in operation 1605, the electronic device 201 may identify whether a designated time has elapsed after identifying that the user does not exist in an area corresponding to the first location. For example, the designated time may be automatically configured by the electronic device 201 or may be configured by the user.

According to an embodiment, in case of identifying that the designated time has not elapsed after identifying that the user does not exist in an area corresponding to the first location ("NO" in operation 1605), the electronic device 201 may continuously identify whether the user exists in an area corresponding to the first location.

According to an embodiment, in case of identifying that the designated time has elapsed after identifying that the user does not exist in an area corresponding to the first location ("YES" in operation 1605), in operation 1607, the electronic device 201 may control a driving device (e.g., the driving device 260 in FIG. 3) so that the electronic device 201 moves to a second location in which the user exists. For example, the reproduction of the content may be paused. For example, the electronic device 201 may control the driving device 260 to track the user (or the location of the user). For example, the electronic device 201 may identify the location of the user while moving to other locations from the first location. The electronic device 201 may identify the second location in which the user is located, based on a tracking result. Thereafter, the electronic device 201 may move to the second location.

According to an embodiment, in operation 1609, after the electronic device 201 has moved to the second location, the electronic device 201 may output a beam corresponding to a content on a second surface corresponding to the second location. For example, the content may be reproduced from a time point at which the reproduction is paused.

According to another embodiment, after moving to the second location, the electronic device 201 may re-identify with the user that the beam is output to the corresponding location. For example, in case that the user requests a beam to be output, the electronic device 201 may output a beam corresponding to the content on the second location. In this case, the content may be reproduced from a time point at which the reproduction is paused.

Figure 17:
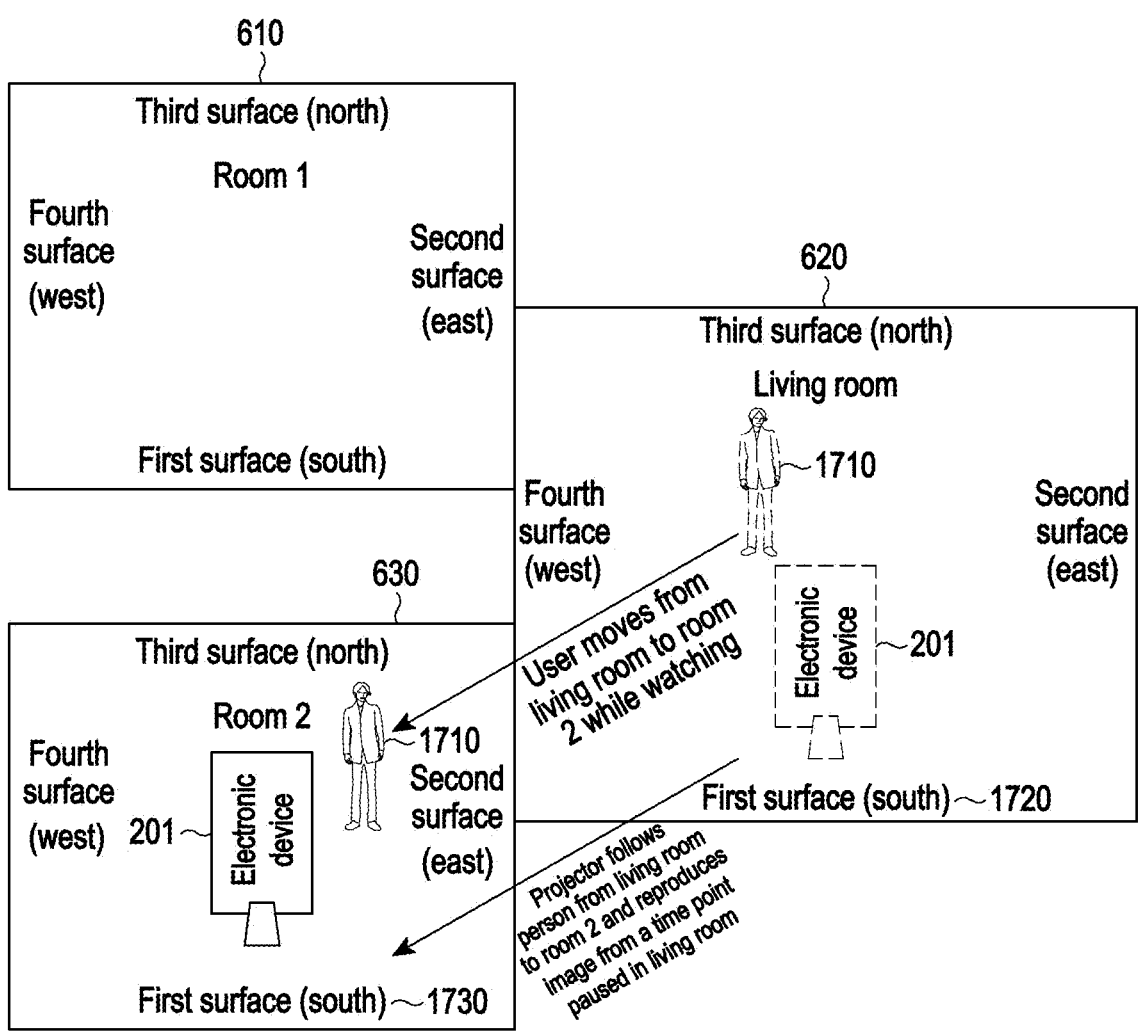
FIG. 17 is a diagram illustrating a method by which an electronic device tracks a user and outputs a beam from a different location according to an embodiment.

FIG. 17 is a diagram illustrating a method by which an electronic device tracks a user and outputs a beam from different locations according to an embodiment.

Referring to FIG. 17, according to an embodiment, the electronic device 201 may identify whether a user 1710 exists in the living room 620 while outputting a beam corresponding to a content on a first surface 1720 of the living room 620.

According to an embodiment, the electronic device 201 may move, based on the user 1710 being identified to move from the living room 620 to the second room 630, from the living room 620 to the second room 630. Here, the electronic device 201 may pause reproduction of a content corresponding to the beam output from a projector (e.g., the projector 240 in FIG. 3).

According to an embodiment, after moving to the second room 630, the electronic device 201 may reproduce the content by outputting a beam on a first surface 1730 of the second room 630. In this case, the content may be reproduced from a time point at which the reproduction is paused.

According to another embodiment, after moving to the second room 630, the electronic device 201 may inquire of the user whether to output a beam to the corresponding location. For example, the electronic device 201 may inquire of the user whether to output a beam to the corresponding location by outputting a voice or displaying a visual object. The electronic device 201 may output, after re-identifying that a beam corresponding to a content is to be output based on a user input, the beam corresponding to a content on the second location.

Figure 18A:
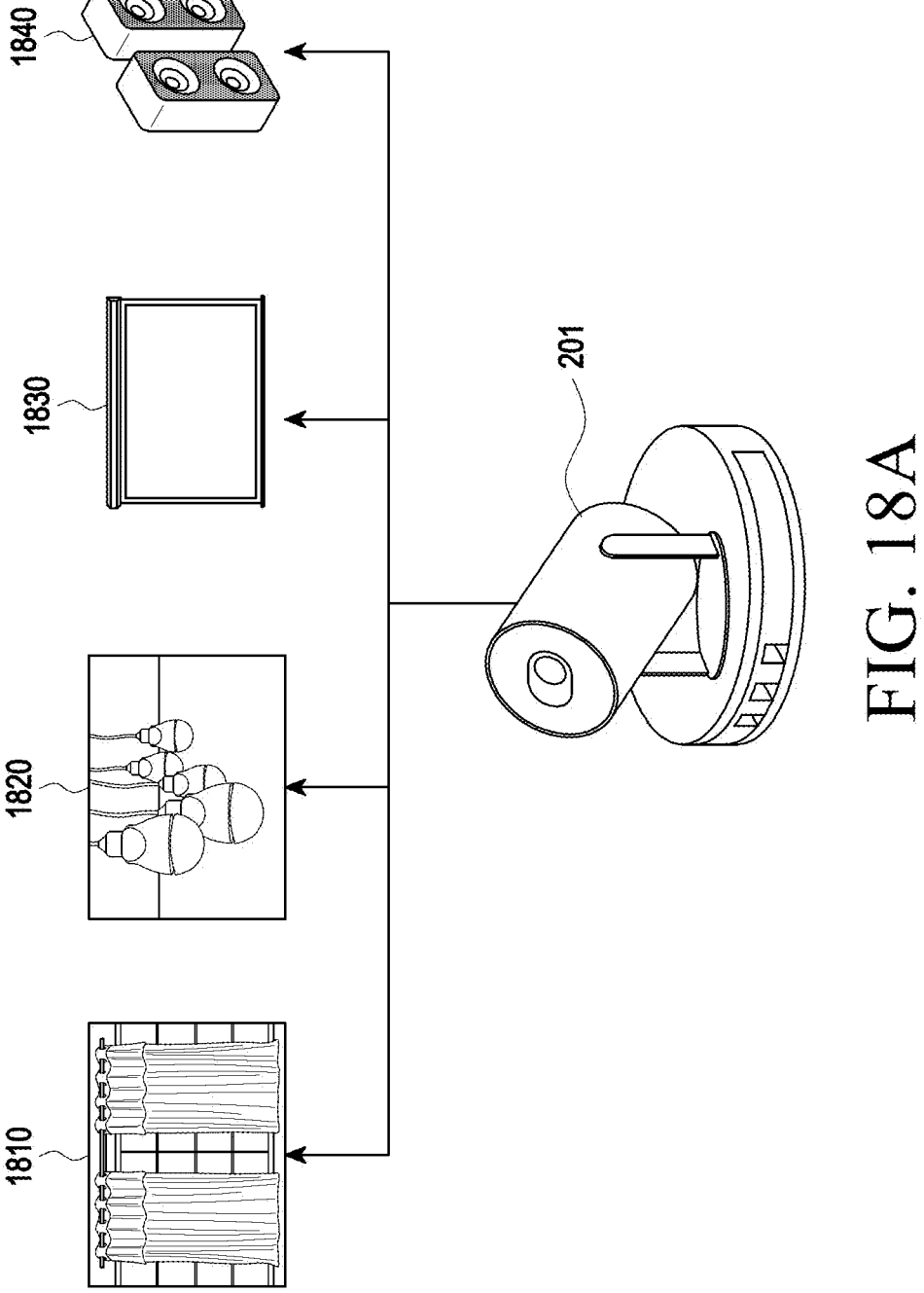
FIGS. 18A and 18B are diagrams illustrating a method by which an electronic device controls surrounding external electronic devices to output a beam according to an embodiment.
Figure 18B:
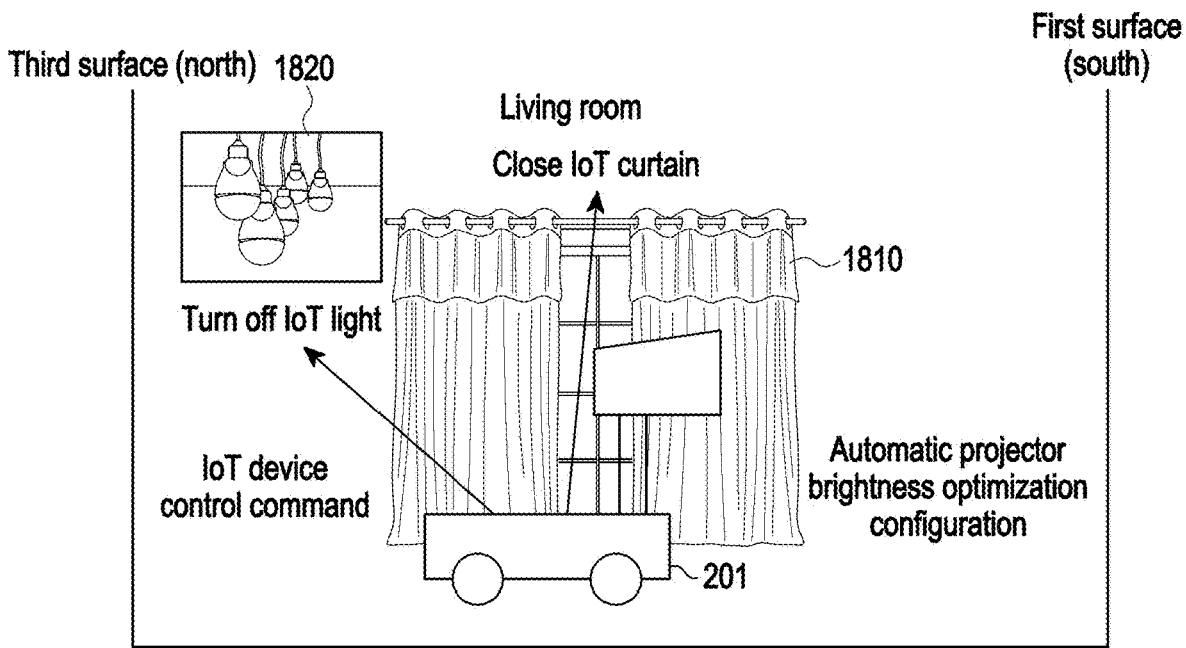

FIGS. 18A and 18B are diagrams illustrating a method by which an electronic device controls surrounding external electronic devices to output a beam according to an embodiment.

Referring to FIG. 18A, according to an embodiment, the electronic device 201 may control external electronic devices 1810, 1820, 1830, and 1840 around the electronic device 201. The electronic device 201 may transmit a control signal to the external electronic devices 1810, 1820, 1830, and 1840 around, by using a communication circuit (e.g., the communication circuit 270 in FIG. 3).

According to an embodiment, in case that a beam corresponding to a content is to be output to a first surface corresponding to a first location, the electronic device 201 may control at least one of the external electronic devices 1810, 1820, 1830, and 1840 around.

Referring to FIG. 18B, according to an embodiment, the electronic device 201 may close a nearby curtain (e.g., external electronic device 1810) for brightness of an image corresponding to a beam while outputting the beam corresponding to a content on the first surface. In addition, the electronic device 201 may turn off a nearby light (e.g., external electronic device 1820) for brightness of an image corresponding to a beam while outputting the beam corresponding to a content on the first surface.

According to the method described above, the electronic device 201 may automatically maintain the image displayed on the first surface corresponding to the first location to an optimal state by using the projector 240. As such, the electronic device 201 may provide convenience when the user uses a projector function.

An electronic device 201 according to an embodiment may include a camera 210, memory 230, a driving device 260 configured to move a location of the electronic device, a projector 240 configured to output a beam, an adjustment device 250 configured to adjust at least one of an angle or a height of the beam output from the projector, and a processor 220. The processor according to an embodiment may be configured to identify, when the electronic device is located in a predetermined space, first values for locations at which a beam corresponding to a content is to be output through the projector in the predetermined space. The processor according to an embodiment may be configured to determine a first location at which a beam corresponding to a content is to be output through the projector, based on the first values, and control the driving device so that the electronic device is moved to the first location. The processor according to an embodiment may be configured to output, when the electronic device is moved to the first location, a first beam for testing through the projector on a first surface corresponding to the first location. The processor according to an embodiment may be configured to identify whether the first image satisfies a designated image condition by inputting, to a first artificial intelligence (AI) model stored in the memory, a first image which is captured through the camera, corresponding to the first beam which is displayed on the first surface. The processor according to an embodiment may be configured to control, based on identifying that the first image does not satisfy the designated image condition, at least one of the adjustment device or the driving device so that the first image satisfies the designated image condition. The processor according to an embodiment may be configured to, based on identifying that the first image satisfies the designated image condition, output the first beam corresponding to the content through the projector on the first surface while controlling, at least one of the adjustment device or the driving device to a state corresponding to the designated image condition.

The processor according to an embodiment may be configured to control at least one of the driving device or the adjustment device to change at least one of a size, a height, an angle, a location, sharpness, a focus, or brightness of the first image until the designated image condition is satisfied. The designated image condition according to an embodiment may include a condition for at least one of the size, the height, the skewness, the sharpness, the focus, or the brightness of the image.

The processor according to an embodiment may be configured to control, based on identifying that the first values for the locations of the predetermined space are not stored in the memory, the driving device to navigate multiple areas included in the predetermined space. The processor according to an embodiment may be configured to acquire images for the multiple areas by using the camera while controlling the driving device. The processor according to an embodiment may be configured to acquire first values for the locations of the predetermined space by inputting the images to the first AI model.

The processor according to an embodiment may be configured to determine the first values for the locations, based on at least one of a size, a material, a color, a pattern, or presence of an object with respect to surfaces included in the multiple areas.

The processor according to an embodiment may be configured to determine ranks of locations of the predetermined space, based on the first values.

The processor according to an embodiment may be configured to determine a location corresponding to a highest value of the first values as the first location.

The processor according to an embodiment may be configured to determine the first location by additionally considering pre-stored user preference.

The processor according to an embodiment may be configured to identify a user input designating a location at which the beam corresponding to the contents is output. The processor according to an embodiment may be configured to determine the first location by additionally considering the user input.

The processor according to an embodiment may be configured to identify a location of the user, by using at least one of the camera, a sensor included in the electronic device, and a communication circuit included in the electronic device. The processor according to an embodiment may be configured to determine the first location, based on the first values and the location of the user.

The processor according to an embodiment may be configured to identify whether the user exists in an area corresponding to the first location, by using at least one of the camera, a sensor included in the electronic device, and a communication circuit included in the electronic device while outputting the beam corresponding to the content on the first surface. The processor according to an embodiment may be configured to control, based on identifying that the user does not exist in an area corresponding to the first location when a designated time has elapsed, the driving device so that the electronic device moves to a second location in which the user exists. The processor according to an embodiment may be configured to output the beam on a second surface corresponding to the second location after the electronic device has moved to the second location.

The processor according to an embodiment may be configured to drive, when the electronic device further includes a cleaning device configured to perform a cleaning operation, the cleaning device to perform a cleaning operation with respect to the predetermined space and acquire images with respect to the multiple areas, by using the camera. The processor according to an embodiment may be configured to update the first values for the locations of the predetermined space by inputting the images to the first AI model.

In a method of operating an electronic device 201 according to an embodiment, the electronic device may include a driving device 260 configured to move a location of the electronic device, a projector 240 configured to output a beam, and an adjustment device 250 configured to adjust at least one of an angle or a height of the beam output from the projector. The method of operating the electronic device according to an embodiment may include an operation of identifying, when the electronic device is located in a predetermined space, first values for locations at which a beam corresponding to a content is to be output through the projector in the predetermined space. The method of operating the electronic device according to an embodiment may include an operation of determining a first location at which a beam corresponding to a content is to be output through the projector, based on the first values, and controlling the driving device so that the electronic device is moved to the first location. The method of operating the electronic device according to an embodiment may include an operation of outputting, when the electronic device is moved to the first location, a first beam for testing through the projector on a first surface corresponding to the first location. The method of operating the electronic device according to an embodiment may include an operation of identifying whether the first image satisfies a designated image condition by inputting, to a first artificial intelligence (AI) model stored in the electronic device, a first image which is captured through a camera 210 included in the electronic device, corresponding to the first beam which is displayed on the first surface. The method of operating the electronic device according to an embodiment may include an operation of controlling, based on identifying that the first image does not satisfy the designated image condition, at least one of the adjustment device or the driving device so that the first image satisfies the designated image condition. The method of operating the electronic device according to an embodiment may include an operation of outputting, based on identifying that the first image satisfies the designated image condition, the first beam corresponding to the content through the projector on the first surface while controlling, at least one of the adjustment device or the driving device to a state corresponding to the designated image condition.

According to an embodiment, the operation of controlling at least one of the driving device or the adjustment device may include an operation of controlling at least one of the driving device or the adjustment device to change at least one of a size, a height, an angle, a location, sharpness, a focus, or brightness of the first image until the designated image condition is satisfied. The designated image condition according to an embodiment may include a condition for at least one of the size, the height, the skewness, the sharpness, the focus, or the brightness of the image.

The method of operating the electronic device according to an embodiment may further include an operation of controlling, based on identifying that the first values for the locations of the predetermined space are not stored in the electronic device, the driving device to navigate multiple areas included in the predetermined space. The method of operating the electronic device according to an embodiment may further include an operation of acquiring images for the multiple areas by using the camera while controlling the driving device. The method of operating the electronic device according to an embodiment may further include an operation of acquiring first values for the locations of the predetermined space by inputting the images to the first AI model.

The operation of acquiring the first values according to an embodiment may further include an operation of determining the first values for the locations, based on at least one of a size, a material, a color, a pattern, or presence of an object with respect to surfaces included in the multiple areas.

The method of operating the electronic device according to an embodiment may further include an operation of determining ranks of locations of the predetermined space, based on the first values.

The operation of determining the first location according to an embodiment may include an operation of determining a location corresponding to a highest value of the first values as the first location.

The operation of determining the first location according to an embodiment may include an operation of determining the first location by additionally considering user preference or a user input pre-stored.

The method of operating the electronic device according to an embodiment may include an operation of identifying whether the user exists in an area corresponding to the first location, by using at least one of the camera, a sensor included in the electronic device, and a communication circuit included in the electronic device while outputting the beam corresponding to the content on the first surface. The method of operating the electronic device according to an embodiment may include an operation of controlling, based on identifying that the user does not exist in an area corresponding to the first location when a designated time has elapsed, the driving device so that the electronic device moves to a second location in which the user exists. The method of operating the electronic device according to an embodiment may further include an operation of outputting the beam on a second surface corresponding to the second location after the electronic device has moved to the second location.

The method of operating the electronic device according to an embodiment may further include an operation of driving, when the electronic device further includes a cleaning device configured to perform a cleaning operation, the cleaning device to perform a cleaning operation with respect to the predetermined space and acquiring images with respect to the multiple areas, by using the camera. The method of operating the electronic device according to an embodiment may further include an operation of inputting the images to the first AI model and updating the first values for the locations of the predetermined space.

A non-transitory computer-readable recording medium (e.g., memory 130 or memory 230) according to an embodiment may store an instruction configured to execute an operation of identifying, when an electronic device 201 is located in a predetermined space, first values for locations at which a beam corresponding to a content is to be output through a projector 240 included in the electronic device in the predetermined space. The non-transitory computer-readable recording medium according to an embodiment may store an instruction configured to execute an operation of determining a first location at which a beam corresponding to a content is to be output through the projector, based on the first values, and controlling a driving device 260 included in the electronic device so that the electronic device is moved to the first location. The non-transitory computer-readable recording medium according to an embodiment may store an instruction configured to execute an operation of outputting, when the electronic device is moved to the first location, a first beam for testing through the projector on a first surface corresponding to the first location. The non-transitory computer-readable recording medium according to an embodiment may store an instruction configured to execute an operation of identifying whether the first image satisfies a designated image condition by inputting, to an artificial intelligence (AI) model stored in the electronic device, a first image which is captured through a camera included in the electronic device, corresponding to the first beam which is displayed on the first surface. The non-transitory computer-readable recording medium according to an embodiment may store an instruction configured to execute an operation of controlling, based on identifying that the first image does not satisfy the designated image condition, at least one of an adjustment device or a driving device included in the electronic device so that the first image satisfies the designated image condition. The non-transitory computer-readable recording medium according to an embodiment may store an instruction configured to execute an operation of outputting, based on identifying that the first image satisfies the designated image condition, the first beam corresponding to the content through the projector on the first surface while controlling, at least one of the adjustment device or the driving device to a state corresponding to the designated image condition.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device1 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a camera;
memory storing one or more computer programs;
a driving device configured to move a location of the electronic device;
a projector configured to output a beam;
an adjustment device configured to adjust at least one of an angle or a height of a beam output from the projector; and
one or more processors communicatively coupled to the memory,
wherein the one or more computer programs include computer-executable instructions that, when executed by the one or more processors individually or collectively, cause the electronic device to:
when the electronic device is located in a predetermined space, identify first values for locations at which a beam corresponding to a content is to be output through the projector in the predetermined space,
determine a first location at which a beam corresponding to a content is to be output through the projector, based on the first values, and control the driving device so that the electronic device is moved to the first location,
when the electronic device has moved to the first location, output a first beam for testing through the projector on a first surface corresponding to the first location,
identify whether a first image satisfies a designated image condition by inputting, to a first artificial intelligence (AI) model stored in the memory, a first image which is captured through the camera, corresponding to the first beam which is displayed on the first surface,
based on identifying that the first image does not satisfy the designated image condition, control at least one of the adjustment device or the driving device so that the first image satisfies the designated image condition, and
based on identifying that the first image satisfies the designated image condition, output the first beam corresponding to the content through the projector on the first surface while controlling at least one of the adjustment device or the driving device to a state corresponding to the designated image condition.

2. The electronic device of claim 1,
wherein the instructions, when executed by the one or more processors individually or collectively, further cause the electronic device to control at least one of the driving device or the adjustment device to change at least one of a size, a height, an angle, a location, sharpness, a focus, or brightness of the first image until the designated image condition is satisfied, and
wherein the designated image condition comprises a condition for at least one of a size, a height, skewness, sharpness, a focus, or brightness of an image.

3. The electronic device of claim 1, wherein the instructions, when executed by the one or more processors individually or collectively, further cause the electronic device to:
based on identifying that the first values for the locations of the predetermined space are not stored in the memory, control the driving device to navigate multiple areas included in the predetermined space,
acquire images for the multiple areas by using the camera while controlling the driving device, and
acquire first values for the locations of the predetermined space by inputting the images to the first AI model.

4. The electronic device of claim 3, wherein the instructions, when executed by the one or more processors individually or collectively, further cause the electronic device to determine the first values for the locations, based on at least one of a size, a material, a color, a pattern, or presence of an object with respect to surfaces included in the multiple areas.

5. The electronic device of claim 3, wherein the instructions, when executed by the one or more processors individually or collectively, further cause the electronic device to:
identify whether a user exists in an area corresponding to the first location, by using at least one of the camera, a sensor included in the electronic device, and a communication circuit included in the electronic device while outputting the beam corresponding to the content on the first surface;
based on identifying that the user does not exist in an area corresponding to the first location when a designated time has elapsed, control the driving device so that the electronic device moves to a second location in which the user is located; and
output the beam on a second surface corresponding to the second location after the electronic device has moved to the second location.

6. The electronic device of claim 3, wherein the instructions, when executed by the one or more processors individually or collectively, further cause the electronic device to:
when the electronic device further comprises a cleaning device configured to perform a cleaning operation, drive the cleaning device to perform a cleaning operation with respect to the predetermined space and acquire images with respect to the multiple areas, by using the camera; and
update the first values for the locations of the predetermined space by inputting the images to the first AI model.

7. The electronic device of claim 1, wherein the instructions, when executed by the one or more processors individually or collectively, further cause the electronic device to determine ranks of locations of the predetermined space, based on the first values.

8. The electronic device of claim 1, wherein the instructions, when executed by the one or more processors individually or collectively, further cause the electronic device to determine a location corresponding to a highest value of the first values as the first location.

9. The electronic device of claim 1, wherein the instructions, when executed by the one or more processors individually or collectively, further cause the electronic device to determine the first location by additionally considering pre-stored user preference.

10. The electronic device of claim 1, wherein the instructions, when executed by the one or more processors individually or collectively, further cause the electronic device to:
  identify a user input designating a location at which the beam corresponding to the content is output; and
  determine the first location by additionally considering the user input.

11. The electronic device of claim 1, wherein the instructions, when executed by the one or more processors individually or collectively, further cause the electronic device to:
  identify a location of a user, by using at least one of the camera, a sensor included in the electronic device, and a communication circuit included in the electronic device; and
  determine the first location, based on the first values and the location of the user.

12. A method of operating an electronic device, the electronic device comprising a driving device configured to move a location of the electronic device, a projector configured to output a beam, and an adjustment device configured to adjust at least one of an angle or a height of a beam output from the projector, the method comprising:
  when the electronic device is located in a predetermined space, identifying first values for locations at which a beam corresponding to a content is to be output through the projector in the predetermined space;
  determining a first location at which a beam corresponding to a content is to be output through the projector, based on the first values, and controlling the driving device so that the electronic device is moved to the first location;
  when the electronic device is moved to the first location, outputting a first beam for testing through the projector on a first surface corresponding to the first location;
  identifying whether a first image satisfies a designated image condition by inputting, to a first artificial intelligence (AI) model stored in the electronic device, a first image which is captured through a camera included in the electronic device, corresponding to the first beam which is displayed on the first surface;
  based on identifying that the first image does not satisfy the designated image condition, controlling at least one of the adjustment device or the driving device so that the first image satisfies the designated image condition; and
  based on identifying that the first image satisfies the designated image condition, outputting the first beam corresponding to the content through the projector on the first surface while controlling at least one of the adjustment device or the driving device to a state corresponding to the designated image condition.

13. The method of claim 12,
  wherein the controlling of at least one of the driving device or the adjustment device comprises controlling at least one of the driving device or the adjustment device to change at least one of a size, a height, an angle, a location, sharpness, a focus, or brightness of the first image until the designated image condition is satisfied, and
  wherein the designated image condition comprises a condition for at least one of a size, a height, skewness, sharpness, a focus, or brightness of an image.

14. The method of claim 12, further comprising:
  based on identifying that the first values for the locations of the predetermined space are not stored in the electronic device, controlling the driving device to navigate multiple areas included in the predetermined space;
  acquiring images for the multiple areas by using the camera while controlling the driving device; and
  acquiring first values for the locations of the predetermined space by inputting the images to the first AI model.

15. The method of claim 14, wherein the acquiring of the first values comprises determining the first values for the locations, based on at least one of a size, a material, a color, a pattern, or presence of an object with respect to surfaces included in the multiple areas.

16. The method of claim 12, further comprising:
  determining ranks of locations of the predetermined space, based on the first values.

17. The method of claim 12, wherein the determining of the first location comprises determining a location corresponding to a highest value of the first values as the first location.

18. The method of claim 12, wherein the determining of the first location comprises determining the first location by additionally considering user preference or a user input pre-stored.

19. The method of claim 12, further comprising:
  identifying whether a user exists in an area corresponding to the first location, by using at least one of the camera, a sensor included in the electronic device, and a communication circuit included in the electronic device while outputting the beam corresponding to the content on the first surface;
  based on identifying that the user does not exist in an area corresponding to the first location when a designated time has elapsed, controlling the driving device so that the electronic device moves to a second location in which the user exists; and
  outputting the beam on a second surface corresponding to the second location after the electronic device has moved to the second location.

20. One or more non-transitory computer-readable recording media storing one or more computer programs including computer-executable instructions that, when executed by one or more processors of an electronic device individually or collectively, cause the electronic device to perform operations, the operations comprising:
  when the electronic device is located in a predetermined space, identifying first values for locations at which a beam corresponding to a content is to be output through a projector included in the electronic device in the predetermined space;
  determining a first location at which a beam corresponding to a content is to be output through the projector, based on the first values, and controlling a driving device included in the electronic device so that the electronic device is moved to the first location;
  when the electronic device is moved to the first location, outputting a first beam for testing through the projector on a first surface corresponding to the first location;

identifying whether a first image satisfies a designated image condition by inputting, to a first artificial intelligence (AI) model stored in the electronic device, a first image which is captured through a camera included in the electronic device, corresponding to the first beam which is displayed on the first surface;

based on identifying that the first image does not satisfy the designated image condition, controlling at least one of an adjustment device or the driving device included in the electronic device so that the first image satisfies the designated image condition; and based on identifying that the first image satisfies the designated image condition, output the first beam corresponding to the content through the projector on the first surface while controlling at least one of the adjustment device or the driving device to a state corresponding to the designated image condition.

* * * * *